(12) United States Patent
Dimou et al.

(10) Patent No.: US 12,549,286 B2
(45) Date of Patent: Feb. 10, 2026

(54) USING A CONFIGURED NEGATIVE ACKNOWLEDGEMENT TRANSMISSION SCHEME FOR ERROR CAUSE INDICATION

(71) Applicant: QUALCOMM INCORPORATED, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 18/000,649

(22) PCT Filed: Jul. 20, 2021

(86) PCT No.: PCT/US2021/042386
§ 371 (c)(1),
(2) Date: Dec. 2, 2022

(87) PCT Pub. No.: WO2022/020360
PCT Pub. Date: Jan. 27, 2022

(65) Prior Publication Data
US 2023/0299883 A1   Sep. 21, 2023

(30) Foreign Application Priority Data
Jul. 23, 2020 (GR) ............................ 20200100434

(51) Int. Cl.
*H04W 72/04* (2023.01)
*H04B 7/06* (2006.01)
(Continued)

(52) U.S. Cl.
CPC ....... *H04L 1/1671* (2013.01); *H04B 7/06952* (2023.05); *H04L 1/1825* (2013.01); *H04W 28/04* (2013.01)

(58) Field of Classification Search
CPC ... H04L 1/1671; H04L 1/1825; H04L 1/1858; H04L 1/0045; H04L 1/06; H04L 1/1854;
(Continued)

(56) References Cited

U.S. PATENT DOCUMENTS 9,312,933 B2   4/2016 Zhang et al.
10,779,310 B2   9/2020 Wang et al.
(Continued)

FOREIGN PATENT DOCUMENTS

CN   1738215 A   2/2006
CN   110546905 A   12/2019
(Continued)

OTHER PUBLICATIONS

NTT Docomo Inc: "Status Report of WI on New Radio (NR) Access Technology, TSG RAN WG1", 3GPP TSG RAN Meeting #76, RP-171137, West Palm Beach, USA, Jun. 5-8, 2017, May 29, 2017, 118 Pages.

(Continued)

*Primary Examiner* — Mahbubul Bar Chowdhury
(74) *Attorney, Agent, or Firm* — Holland & Hart LLP

(57) ABSTRACT

Methods, systems, and devices for wireless communications are described. For example, a method for wireless communications at a user equipment (UE), may include receiving a configuration indicating a feedback transmission scheme for reporting feedback associated with an error type. The UE may also detect an error in receiving a downlink transmission from a base station, where the detected error is of the error type. Then, the UE may select the feedback transmission scheme for transmitting a negative acknowledgement message for the downlink transmission based at least in part on the detected error being of the error type and the configuration. The UE may also transmit, to the base station, the negative acknowledgement message for the downlink (Continued)

transmission using the selected feedback transmission scheme.

30 Claims, 19 Drawing Sheets

(51) Int. Cl.
*H04L 1/1607* (2023.01)
*H04L 1/1825* (2023.01)
*H04W 28/04* (2009.01)

(58) Field of Classification Search
CPC .... H04L 1/1861; H04L 1/1864; H04W 28/04; H04B 7/0619; H04B 7/0695
See application file for complete search history.

(56) References Cited

U.S. PATENT DOCUMENTS

| | | | |
|---|---|---|---|
| 11,109,236 B2 | 8/2021 | Yerramalli et al. | |
| 11,166,274 B2 | 11/2021 | Gaal et al. | |
| 2003/0228857 A1 | 12/2003 | Maeki | |
| 2007/0041349 A1* | 2/2007 | Kim | H04L 1/1671 370/335 |
| 2007/0259665 A1* | 11/2007 | Chiu | H04L 1/1671 455/436 |
| 2010/0074211 A1* | 3/2010 | Kim | H04L 1/1874 714/748 |
| 2013/0294299 A1* | 11/2013 | Park | H04L 5/0055 370/328 |
| 2015/0078190 A1* | 3/2015 | Cheng | H04L 27/00 370/252 |
| 2020/0383155 A1* | 12/2020 | Pati | H04B 17/336 |
| 2021/0194629 A1* | 6/2021 | Shellhammer | H04L 1/0009 |
| 2022/0070829 A1* | 3/2022 | Kusashima | H04W 72/04 |
| 2022/0131793 A1* | 4/2022 | Ramachandra | H04L 45/44 |
| 2023/0052766 A1* | 2/2023 | Choe | H04W 76/38 |

FOREIGN PATENT DOCUMENTS

| | | |
|---|---|---|
| WO | WO-2014130893 A2 | 8/2014 |
| WO | WO-2019040840 A1 | 2/2019 |
| WO | WO-2019094601 | 5/2019 |
| WO | WO-2019099518 | 5/2019 |
| WO | WO-2020146694 A1 | 7/2020 |

OTHER PUBLICATIONS

Huawei et al., "Multi-Beam Transmission for Robustness", 3GPP TSG RAN WG1 Meeting #89, 3GPP Draft, R1-1708136, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017 (May 14, 2017), pp. 1-5, XP051273332, Section 2, figures 2,3, Section 2.2.

Huawei, et al., "Robust Transmission for UL Control Channel", 3GPP Draft, 3GPP TSG RAN WG1 Meeting AH NR#3, R1-1715721, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339183, 3 Pages, The whole document.

International Search Report and Written Opinion—PCT/US2021/042386—ISA/EPO—Nov. 10, 2021.

* cited by examiner

USING A CONFIGURED NEGATIVE ACKNOWLEDGEMENT TRANSMISSION SCHEME FOR ERROR CAUSE INDICATION

CROSS REFERENCES

The present Application is a 371 national stage filing of International PCT Application No. PCT/US2021/042386 by DIMOU et al. entitled "USING A CONFIGURED NEGATIVE ACKNOWLEDGEMENT TRANSMISSION SCHEME FOR ERROR CAUSE INDICATION," filed Jul. 20, 2021; and claims priority to Greek Patent Application No. 20200100434 by DIMOU et al. entitled "USING A CONFIGURED NEGATIVE ACKNOWLEDGEMENT TRANSMISSION SCHEME FOR ERROR CAUSE INDICATION," filed Jul. 23, 2020, each of which is assigned to the assignee hereof, and each of which is expressly incorporated by reference in its entirety herein.

FIELD OF TECHNOLOGY

The following relates to wireless communications, including using a configured negative acknowledgement transmission scheme for error cause indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support using a configured negative acknowledgement transmission scheme for error cause indication.

In some wireless communications systems, a UE may report feedback to a base station based on a decoding outcome of a communication at the UE. For example, the UE may transmit a positive acknowledgement (ACK) when the decoding is successful, or the UE may transmit a negative acknowledgement (NACK) when the decoding is unsuccessful. A base station may adjust communication parameters based on receiving a NACK. In some examples, NACK messages may be transmitted via beam sweeping by default. Thus, a UE may perform extraneous actions relative to transmitting NACK via a single beam in an attempt to successfully convey feedback to a base station. As a result, improved techniques may be desired for ensuring efficient UE NACK feedback transmissions for improved quality of communications.

Generally, the described techniques provide for efficient feedback to a base station based on error type detection protocol and feedback transmission schemes, for example, during ultra-reliable communications. A user equipment (UE) may be configured by the network to report feedback such as an ACK or a NACK according to the cause of the NACK. The configuration may also include a feedback transmission scheme indicating to transmit via a single uplink beam (e.g., not beam sweeping), to be used by the UE for some error cause types.

For example, a UE may be configured to report a NACK using an uplink beam sweep when a physical downlink shared channel (PDSCH) error cause is due to the UE being out of coverage of a base station, beam blocking, or is an unknown error cause. Additionally, or alternatively, the UE may be configured to report a NACK using a single uplink beam when a PDSCH error cause is due to interference or frequency selective fading. The error cause detection results and reporting may allow for optimized link adaptation at the UE and base station by allowing the UE to share error cause information with the base station. In some cases, the UE may improve resource utilization by avoiding excessive use of uplink beams for unnecessary beam sweeping and may lower UE power consumption by reducing the use of uplink beam sweeping.

A method of wireless communications at a UE is described. The method may include receiving a configuration indicating a feedback transmission scheme for reporting feedback associated with an error type, detecting an error in receiving a downlink transmission, where the detected error is of the error type, selecting the feedback transmission scheme for transmitting a NACK message for the downlink transmission based on the detected error being of the error type and the configuration, and transmitting the NACK message for the downlink transmission using the selected feedback transmission scheme.

An apparatus for wireless communications at a UE is described. The apparatus may include a processor and a memory coupled with the processor, wherein the memory comprises instructions executable by the processor to cause the apparatus to receive a configuration indicating a feedback transmission scheme for reporting feedback associated with an error type, detect an error in receiving a downlink transmission, where the detected error is of the error type, select the feedback transmission scheme for transmitting a NACK message for the downlink transmission based on the detected error being of the error type and the configuration, and transmit the NACK message for the downlink transmission using the selected feedback transmission scheme.

Another apparatus for wireless communications at a UE is described. The apparatus may include means for receiving a configuration indicating a feedback transmission scheme for reporting feedback associated with an error type, detecting an error in receiving a downlink transmission, where the detected error is of the error type, selecting the feedback transmission scheme for transmitting a NACK message for the downlink transmission based on the detected error being of the error type and the configuration, and transmitting the NACK message for the downlink transmission using the selected feedback transmission scheme.

A non-transitory computer-readable medium storing code for wireless communications at a UE is described. The code may include instructions executable by a processor to receive a configuration indicating a feedback transmission scheme for reporting feedback associated with an error type, detect an error in receiving a downlink transmission, where the detected error is of the error type, select the feedback transmission scheme for transmitting a NACK message for the downlink transmission based on the detected error being of the error type and the configuration, and transmit the NACK message for the downlink transmission using the selected feedback transmission scheme.

In some examples of the method, apparatuses, and non-transitory computer-readable medium described herein, transmitting the NACK further may include operations, features, means, or instructions for transmitting error cause information in connection with the NACK, where the error cause information indicates the error type.

In some examples of the method, apparatuses, and non-transitory computer-readable medium described herein, detecting the error in receiving the downlink transmission further may include operations, features, means, or instructions for determining that the UE may be out of coverage of the base station during the downlink transmission, wherein the error type includes an out of coverage error type.

In some examples of the method, apparatuses, and non-transitory computer-readable medium described herein, selecting the feedback transmission scheme for transmitting the NACK message for the downlink transmission further may include operations, features, means, or instructions for determining to perform beam sweeping for transmitting the NACK message and error cause information to the base station based at least in part on the out of coverage error type and the configuration.

In some examples of the method, apparatuses, and non-transitory computer-readable medium described herein, detecting the error in receiving the downlink transmission further may include operations, features, means, or instructions for determining that a transmit beam may be completely blocked during the downlink transmission, wherein the error type includes a complete beam blocking error type.

In some examples of the method, apparatuses, and non-transitory computer-readable medium described herein, selecting the feedback transmission scheme for transmitting the NACK message for the downlink transmission further may include operations, features, means, or instructions for determining to perform beam sweeping for transmitting the NACK and error cause information based at least in part on the complete beam blocking error type and the configuration.

In some examples of the method, apparatuses, and non-transitory computer-readable medium, determining that the transmit beam may be completely blocked during the downlink transmission may be in response to an absence of an out of coverage error type for the downlink transmission.

In some examples of the method, apparatuses, and non-transitory computer-readable medium described herein, detecting the error in receiving the downlink transmission further may include operations, features, means, or instructions for determining that a transmit beam may be partially blocked during the downlink transmission, wherein the error type includes a partial beam blocking error type.

In some examples of the method, apparatuses, and non-transitory computer-readable medium described herein, selecting the feedback transmission scheme for transmitting the NACK message for the downlink transmission further may include operations, features, means, or instructions for determining to perform beam sweeping for transmitting the NACK and error cause information based on the partial beam blocking error type and the configuration.

In some examples of the method, apparatuses, and non-transitory computer-readable medium described herein, determining that the transmit beam may be partially blocked during the downlink transmission may be in response to an absence of an out of coverage error type for the downlink transmission and an absence of a complete beam blocking error type for the downlink transmission.

In some examples of the method, apparatuses, and non-transitory computer-readable medium described herein, detecting the error in receiving the downlink transmission further may include operations, features, means, or instructions for determining that interference may be present during the downlink transmission, wherein the error type includes an interference error type.

In some examples of the method, apparatuses, and non-transitory computer-readable medium described herein, selecting the feedback transmission scheme for transmitting the NACK message for the downlink transmission further may include operations, features, means, or instructions for determining to transmit, via an uplink beam without beam sweeping, the NACK and error cause information based on the interference error type and the configuration.

In some examples of the method, apparatuses, and non-transitory computer-readable medium described herein, determining that interference may be present during the downlink transmission may be in response to an absence of an out of coverage error type for the downlink transmission, an absence of a complete beam blocking error type for the downlink transmission, and an absence of a partial beam blocking error type for the downlink transmission.

In some examples of the method, apparatuses, and non-transitory computer-readable medium described herein, detecting the error in receiving the downlink transmission further may include operations, features, means, or instructions for determining that frequency selective fading may be present during the downlink transmission, where the error type includes a frequency selective fading error type.

In some examples of the method, apparatuses, and non-transitory computer-readable medium described herein, selecting the feedback transmission scheme for transmitting the NACK message for the downlink transmission further may include operations, features, means, or instructions for determining to transmit, via an uplink beam, a plurality of repetitions of the NACK and error cause information based on the frequency selective fading error type and the configuration.

Some examples of the method, apparatuses, and non-transitory computer-readable medium described herein may further include operations, features, means, or instructions for determining the plurality of repetitions to transmit based on the configuration, wherein the plurality of repetitions may be in the frequency domain.

In some examples of the method, apparatuses, and non-transitory computer-readable medium described herein, determining that frequency selective fading may be present during the downlink transmission may be in response to an absence of an out of coverage error type for the downlink transmission, an absence of a complete beam blocking error type for the downlink transmission, an absence of a partial beam blocking error type for the downlink transmission, and an absence of an interference error type for the downlink transmission.

In some examples of the method, apparatuses, and non-transitory computer-readable medium described herein, detecting the error in receiving the downlink transmission further may include operations, features, means, or instructions for determining a cause of error for the downlink transmission may be unknown may be in response to an absence of an out of coverage error type for the downlink transmission, an absence of a complete beam blocking error type for the downlink transmission, an absence of a partial beam blocking error type for the downlink transmission, an absence of an interference error type for the downlink transmission, and an absence of a frequency selective fading, wherein the error type includes an unknown error type.

In some examples of the method, apparatuses, and non-transitory computer-readable medium described herein, selecting the feedback transmission scheme for transmitting the NACK message for the downlink transmission further may include operations, features, means, or instructions for determining to perform beam sweeping for transmitting the NACK and error cause information based on the unknown error type and the configuration.

Some examples of the method, apparatuses, and non-transitory computer-readable medium described herein may further include operations, features, means, or instructions for determining to perform a subset of an error cause protocol based on network deployment density, UE battery level, UE uplink load, or cross link interference detection.

In some examples of the method, apparatuses, and non-transitory computer-readable medium described herein, the subset of the error cause protocol includes one or both of an interference check and a frequency fading check based on the UE battery level being below a battery threshold.

In some examples of the method, apparatuses, and non-transitory computer-readable medium described herein, the subset of the error cause protocol includes one or both of an interference check and a frequency fading check based on the UE uplink load being above an uplink load threshold.

In some examples of the method, apparatuses, and non-transitory computer-readable medium described herein, the subset of the error cause protocol includes one or both of an interference check and a frequency fading check based on the cross link interference detection at an additional UE.

In some examples of the method, apparatuses, and non-transitory computer-readable medium described herein, receiving the configuration for reporting feedback associated with error detection further may include operations, features, means, or instructions for receiving a radio resource control message including an information element for reporting feedback associated with error detection.

A method of wireless communications at a base station is described. The method may include transmitting a configuration indicating a feedback transmission scheme for reporting feedback associated with an error type, transmitting a downlink transmission, and receiving a NACK message for the downlink transmission via a feedback transmission scheme based on the configuration.

An apparatus for wireless communications at a base station is described. The apparatus may include a processor and a memory coupled with the processor, wherein the memory comprises instructions executable by the processor to cause the apparatus to transmit a configuration indicating a feedback transmission scheme for reporting feedback associated with an error type, transmit a downlink transmission, and receive a NACK message for the downlink transmission via a feedback transmission scheme based on the configuration.

Another apparatus for wireless communications at a base station is described. The apparatus may include means for transmitting a configuration indicating a feedback transmission scheme for reporting feedback associated with an error type, transmitting a downlink transmission, and receiving a NACK message for the downlink transmission via a feedback transmission scheme based on the configuration.

A non-transitory computer-readable medium storing code for wireless communications at a base station is described. The code may include instructions executable by a processor to transmit a configuration indicating a feedback transmission scheme for reporting feedback associated with an error type, transmit a downlink transmission, and receive a NACK message for the downlink transmission via a feedback transmission scheme based on the configuration.

In some examples of the method, apparatuses, and non-transitory computer-readable medium described herein, receiving the NACK further may include operations, features, means, or instructions for receiving error cause information in connection with the NACK, where the error cause information indicates the error type.

Some examples of the method, apparatuses, and non-transitory computer-readable medium described herein may further include operations, features, means, or instructions for adapting radio link parameters based at least in part on receiving the error cause information in connection with the NACK.

In some examples of the method, apparatuses, and non-transitory computer-readable medium described herein, the configuration indicates to perform a beam sweep as the feedback transmission scheme based on an out of coverage error type.

In some examples of the method, apparatuses, and non-transitory computer-readable medium described herein, the configuration indicates to perform a beam sweep as the feedback transmission scheme based on a complete beam blocking error type.

In some examples of the method, apparatuses, and non-transitory computer-readable medium described herein, the configuration indicates to perform a beam sweep as the feedback transmission scheme based on a partial beam blocking error type.

In some examples of the method, apparatuses, and non-transitory computer-readable medium described herein, the configuration indicates to transmit via an uplink beam without beam sweeping as the feedback transmission scheme based on an interference error type.

In some examples of the method, apparatuses, and non-transitory computer-readable medium described herein, the configuration indicates to transmit via an uplink beam without beam sweeping as the feedback transmission scheme based on a frequency selective fading error type.

In some examples of the method, apparatuses, and non-transitory computer-readable medium described herein, the configuration indicates a set of repetitions in the frequency domain to transmit based on the frequency selective fading error type.

In some examples of the method, apparatuses, and non-transitory computer-readable medium described herein, the configuration indicates to perform a beam sweep as the feedback transmission scheme based on an unknown error type.

In some examples of the method, apparatuses, and non-transitory computer-readable medium described herein, transmitting the configuration for reporting feedback associated with error detection further may include operations, features, means, or instructions for transmitting a radio resource control (RRC) message including an information element for reporting feedback associated with error detection.

DETAILED DESCRIPTION

Figure 1:
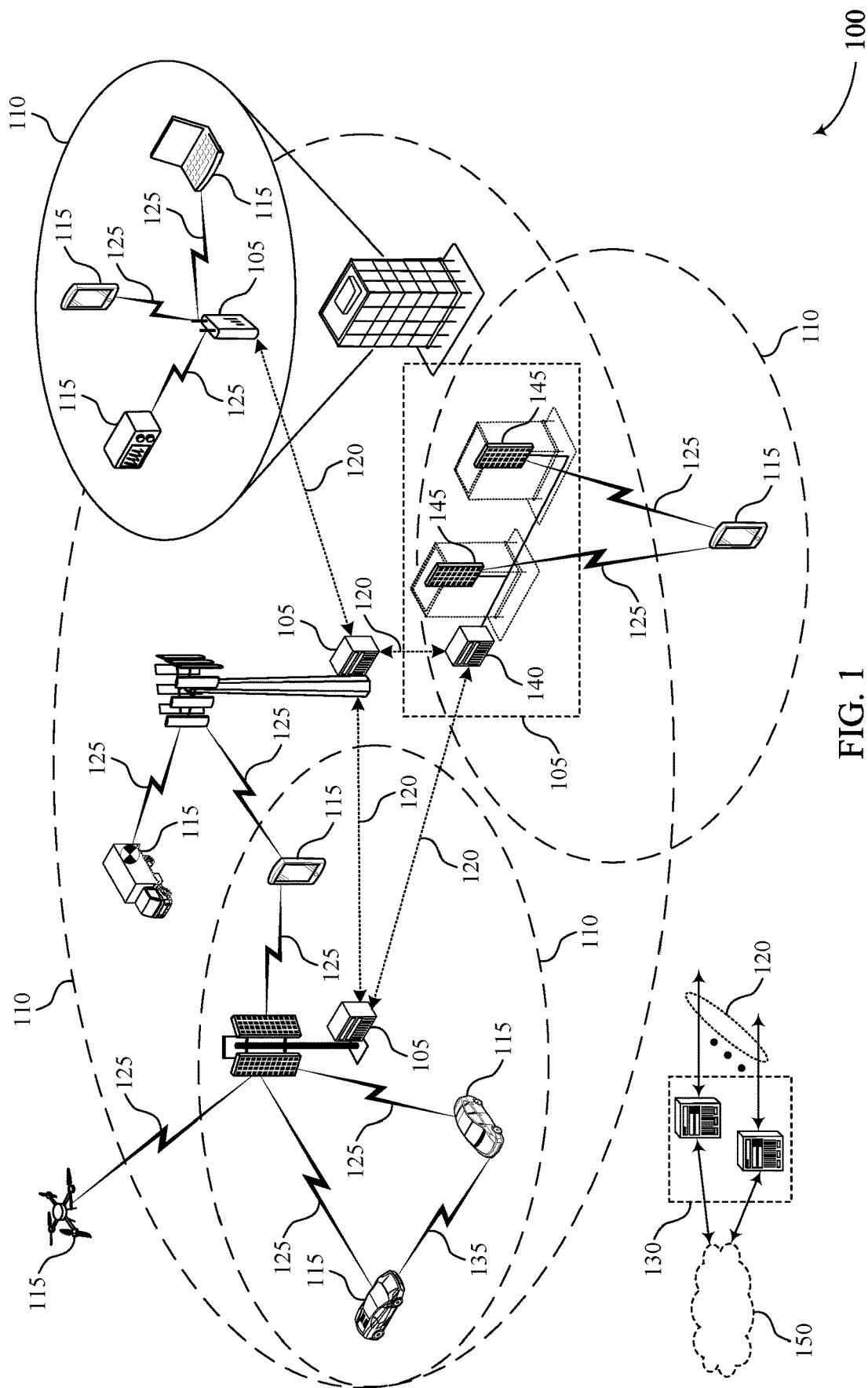
FIG. 1 illustrates an example of a wireless communications system that supports using a configured negative acknowledgement transmission scheme for error cause indication in accordance with aspects of the present disclosure.

In some wireless communications systems, a user equipment (UE) may report feedback to a base station based on a decoding outcome of a communication at the UE. For example, the UE may transmit a positive acknowledgement (ACK) when the decoding is successful, or the UE may transmit a negative acknowledgement (NACK) when the decoding is unsuccessful. A base station may adjust communication parameters based on receiving a NACK. In some examples, NACK messages may be transmitted via beam sweeping by default. Thus, a UE may perform extraneous actions relative to transmitting NACK via a single beam in an attempt to successfully convey feedback to a base station. As a result, improved techniques may be desired for ensuring efficient UE NACK feedback transmissions for improved quality of communications.

A UE may be configured to perform error cause detection and to select a feedback transmissions scheme for improved resource utilization based on the error cause detection. In some cases, a UE may be configured to transmit a NACK, based on a detected error, via uplink beam sweeping by default. The UE may perform extraneous actions in an attempt to successfully convey NACK feedback via beam sweeping. For example, some physical downlink shared channel (PDSCH) errors may be due to temporary interference or frequency fading, which may be overcome without beam sweeping, while feedback for an error due to beam blocking may be avoided by uplink beam sweeping. Additionally, a UE being required to transmit NACK via beam sweeping may cause excessive power consumption and a high uplink load burden that may waste resources. Thus, an error cause detection protocol with associated feedback transmission schemes may result in improved link adaptation than the default configuration of beam sweeping NACK transmissions.

As described herein, the inefficient beam sweeping of all NACK feedback described above may be avoided by configuring a UE to follow a new protocol that defines error cause evaluations. The UE may use these evaluations to detect what caused the error of the PDSCH reception and how to report feedback based on the evaluations. The error cause evaluation protocol may follow a certain order such as determining if the UE is out of coverage, determining if the error is due to beam blocking, determining if the error is due to partial beam blocking, determining if the error is due to interference, and determining if the error is due to frequency fading. Once the UE determines the cause of error, the UE may report the cause and may end the protocol without evaluating the next option. The network may respond to the report with a proper link adaptation informed by the error cause information. If the protocol is completed without determining the error cause, then the error cause is determined to be unknown. This error cause protocol may include configurations indicating when NACK transmissions do not have to use uplink beam sweeping. Thus, the configuration and protocol may enable the UE to conserve power and resources when possible. For example, the UE may determine when to transmit the NACK over a beam sweep (e.g., if error is due to beam blocking) or when a beam sweep is unnecessary (e.g., when the error is due to interference or frequency fading) based on the order of the protocol and the beam sweep configuration. In some examples, the feedback transmission scheme (e.g., beam sweep or single beam) may be an indirect indication of reason for the PDSCH error.

Aspects of the disclosure are initially described in the context of wireless communications systems. Aspects of the disclosure are further illustrated by and described with reference to apparatus diagrams, system diagrams, and flowcharts that relate to using a configured negative acknowledgement transmission scheme for error cause indication.

FIG. 1 illustrates an example of a wireless communications system 100 that supports using a configured negative acknowledgement transmission scheme for error cause indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-barrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-barrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, UE 115 may be configured (e.g., via an RRC message) to determine if an error type is detected when PDSCH decoding is unsuccessful. The UE 115 may also be configured to report error cause information based on the error detection procedure. As described herein, UE 115 may indicate the error cause information with NACK feedback. More specifically, UE 115 may attempt to decode a PDSCH from a base station 105. If the UE 115 is able to decode the PDSCH successfully, then the UE 115 may transmit an ACK to the base station 105. If the UE 115 is unable to decode the PDSCH successfully, then the UE 115 may perform an error type evaluation based on the configuration.

For example, the UE 115 may receive a configuration that indicates a feedback transmission scheme for reporting feedback associated with an error type of an unsuccessful PDSCH reception from the base station 105. For example, the error type may be one of: an out of coverage error type, a beam blocking error type, a partial beam blocking error type, an interference error type, a frequency selective fading error type, or an unknown error type. The configuration may include a procedure for checking if the error cause is the UE 115 being out of coverage of base station 105, beam blocking, partial beam blocking, interference, or frequency selective fading, and identifying the error type accordingly. The UE 115 may detect an error in receiving a downlink transmission (e.g., a PDSCH) from a base station 105, where the detected error is of the error type. Then, the UE 115 may select the feedback transmission scheme (e.g., to use beam sweeping or not) for transmitting a NACK message for the downlink transmission based on the detected error being of the error type. The UE 115 may transmit, with or without beam sweeping, to the base station 105, the NACK message for the downlink transmission using the selected feedback transmission scheme. The base station 105 may receive the NACK and error type information and adjust the communication link 125 parameters, such as a modulation and coding scheme (MCS) and transmission configuration indication (TCI) state, based on the NACK and error type information.

Figure 2:
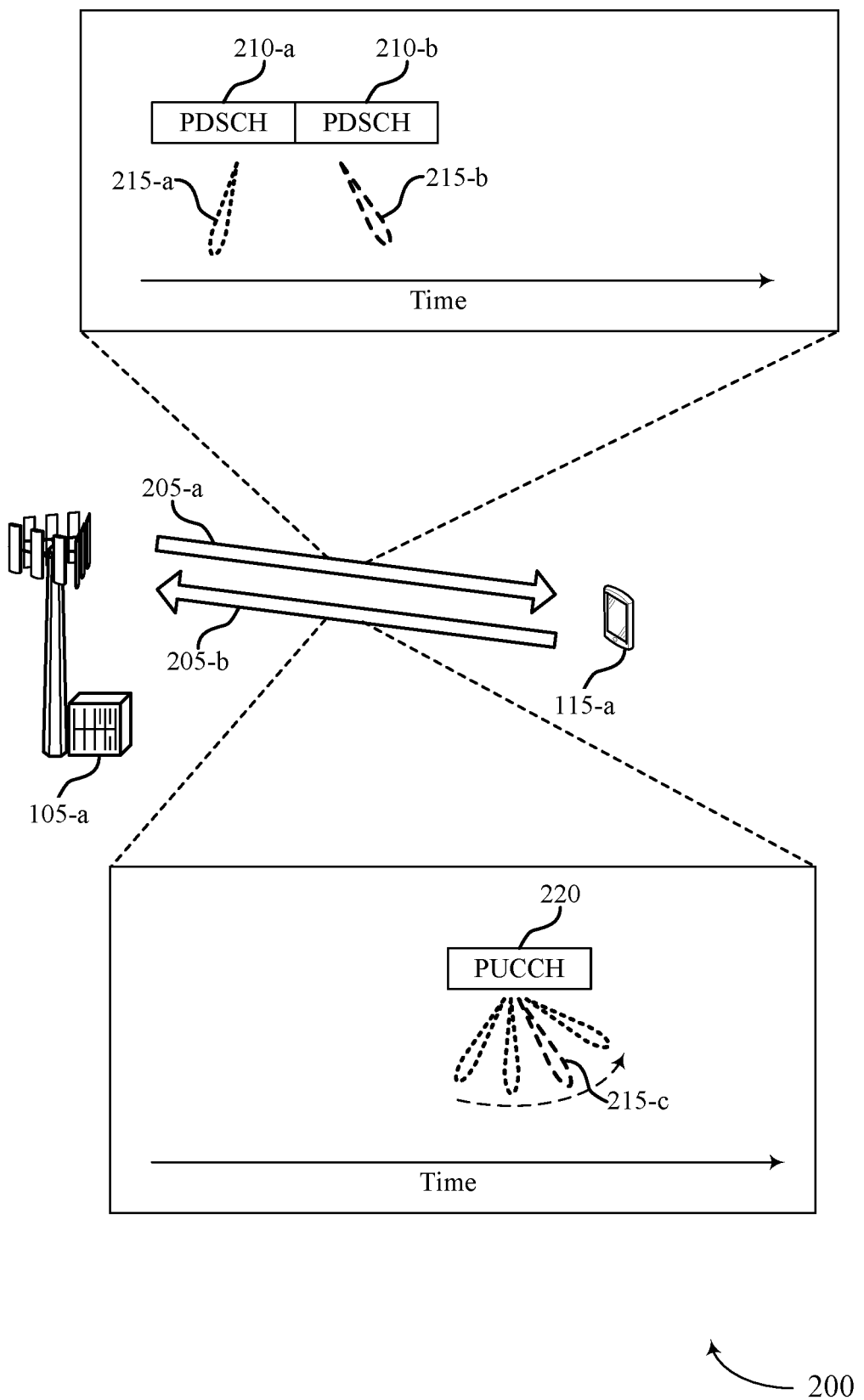
FIG. 2 illustrates an example of a wireless communications system that supports using a configured negative acknowledgement transmission scheme for error cause indication in accordance with aspects of the present disclosure.

FIG. 2 illustrates an example of a wireless communications system 200 that supports using a configured negative acknowledgement transmission scheme for error cause indication in accordance with aspects of the present disclosure. In some examples, wireless communications system 200 may implement aspects of wireless communications system 100. Wireless communications system 200 may include UE 115-*a* and base station 105-*a*, which may be respective examples of a UE 115 and a base station 105, as described with reference to FIG. 1.

In wireless communications system 200, base station 105-*a* and UE 115-*a* may be in communication with one another. For example, base station 105-*a* may transmit information to UE 115-*a* on downlink 205-*a*, and UE 115-*a* may transmit information to base station 105-*a* on uplink 205-*b*. Base station 105-*a* may configure UE 115-*a* (e.g., via an RRC message) to perform PDSCH error cause detection and report the findings of the detection back to the base station 105-*a* with feedback (e.g., NACK). For example, an information element (IE) may be included in an RRC message to configure UE 115-*a*. The configuration may include parameters to use for PDSCH error cause detection, such as an order of error checks to follow or when to transmit NACK via uplink beam sweeping or a single beam. In some examples, downlink 205-*a* and uplink 205-*b* may be configured for ultra-reliable low latency communications (URLLC).

Base station 105-*a* may transmit PDSCH 210 using multiple TRPs. Specifically, a first transmission of PDSCH 210-*a* may be transmitted at a first time via beam 215-*a*, and a second transmission of PDSCH 210-*b* may be transmitted at a second time via beam 215-*b*. The transmissions PDSCH 210-*a* and 210-*b* may include the same data packet and may both be assigned a same sequence number. In some examples, PDSCH 210 may be semi-persistently scheduled by base station 105-*a*.

UE 115-*a* may attempt to decode PDSCH 210. For example, UE 115-*a* may attempt a joint decoding of PDSCH 210-*a* and 210-*b*. In some cases, UE 115-*a* may not be able to successfully decode the PDSCH 210. Unsuccessful decoding may be a result of a specific error type such as the UE being out of coverage of the base station 105-*a*, beam blocking, downlink interference, cross link interference, frequency fading, as well as many other reasons. Accordingly, upon an error in PDSCH 210 reception, the UE 115-*a* may attempt to determine the cause of the error. For example, the UE 115-*a* may follow the error cause detection protocol described in more detail with respect to FIG. 3 to determine a transmission scheme for the NACK. The UE 115-*a* may select to transmit NACK in a physical uplink control channel (PUCCH) 220 via an uplink beam sweeping procedure or may to transmit the NACK in PUCCH 220 via a single uplink beam 215-*b*.

In some examples, the UE 115-*a* may be battery powered and for certain error cause types, may prefer to avoid beam sweeping the NACK, where avoiding beam sweep avoids additional power consumption and uplink load. Additionally, by transmitting NACK on a single beam instead of via a beam sweep, the UE 115-*a* may reduce the risk for uplink cell interference such as cross link interference. For example, if the error cause is interference or frequency selective fading, then the UE may select to transmit NACK in a PUCCH 220 via a single uplink beam 215-*b*. In other examples, if the error cause is the UE being out of coverage of the base station 105-*a*, complete or partial beam blocking, or unknown, then the UE may select to transmit NACK in a PUCCH 220 via an uplink beam sweep.

The base station 105-*a* may receive the NACK and error cause information via the PUCCH 220. Consequently, the base station 105-*a* may adapt communicating parameters, such as MCS or TCI state, based on the error cause information. Thus, the base station 105-*a* may make an informed decision about what link adaptation actions to take, based on the error cause, to efficiently retransmit to UE 115-*a*.

Figure 3:
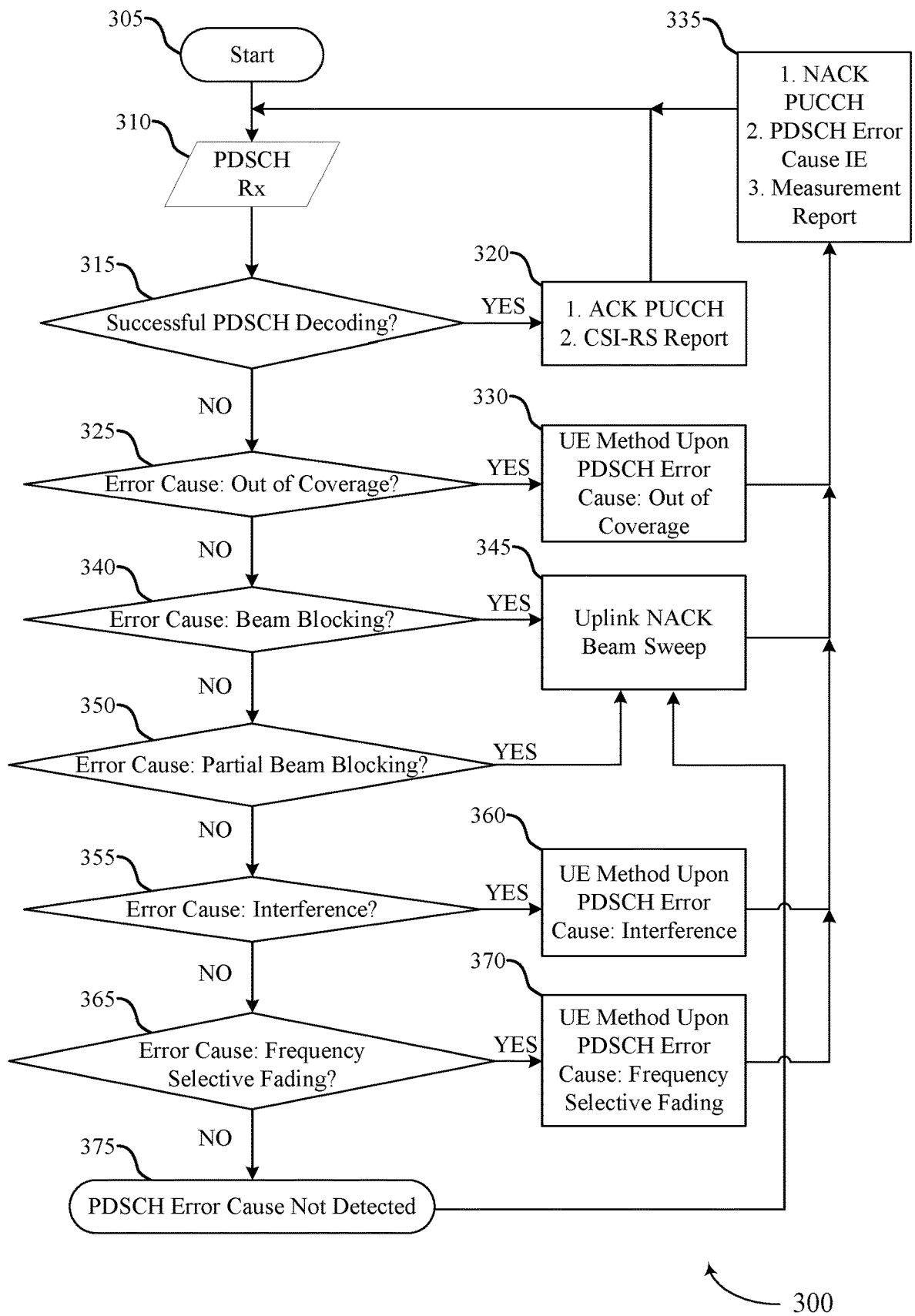
FIG. 3 illustrates an example of a flowchart that supports using a configured negative acknowledgement transmission scheme for error cause indication in accordance with aspects of the present disclosure.

FIG. 3 illustrates an example of a flowchart 300 that supports using a configured negative acknowledgement transmission scheme for error cause indication in accordance with aspects of the present disclosure. In some examples, flowchart 300 may implement aspects of wireless communications system 100. Flowchart 300 may be an error cause detection procedure implemented at a UE such as UE 115 as described with reference to FIGS. 1 and 2.

At 305, the UE may start the error cause detection procedure. At 310, UE may attempt to receive a PDSCH. At 315, UE may determine if the UE was able to successfully receive and decode at least a portion of a PDSCH. If the UE was able to receive at least a portion of the PDSCH, then the UE proceeds to 320. At 320, the UE may transmit an ACK in a PUCCH to the base station and, in some cases, may transmit a CSI-RS measurement report. But, if the UE was not able to receive at least a portion of the PDSCH, then the UE may determine there was an error and proceed to 325.

At 325, the UE may check if the PDSCH error cause was the UE being out of coverage of the base station. If the PDSCH error cause was the UE being out of coverage, then the UE may proceed to 330. At 330, the UE may follow the UE method upon PDSCH error cause: out of coverage and then proceed to 335. For example, the UE may determine to transmit a multi-slot PUCCH transmission including a NACK with uplink beam sweeping based on a preconfigured pattern, which may include an indication of the PDSCH error cause as being out of coverage. In another example, the UE method may include performing a UE autonomous handover to a new base station. At 335, the UE may transmit the NACK in a PUCCH, and in some cases, the NACK may also include a PDSCH error cause IE that identifies the determined error cause for the base station. In some examples, the UE may also transmit a measurement report such as a CSI-RS report or an error cause measurement report. If the PDSCH error cause was not the UE being out of coverage, then the UE may proceed to 340.

At 340, the UE may check if the PDSCH error cause is complete beam blocking. If the PDSCH error cause was complete beam blocking, then the UE may proceed to 345. At 345, the UE may determine to transmit uplink NACK using a beam sweep and then proceed to 335. At 335, the UE may transmit the NACK in a PUCCH, and in some cases, the NACK may also include a PDSCH error cause IE that identifies the determined error cause for the base station. In some examples, the UE may also transmit a measurement report such as a CSI-RS report or an error cause measurement report. If the PDSCH error cause was not the UE being out of coverage or complete beam blocking, then the UE may proceed to 350.

At 350, the UE may check if the PDSCH error cause is partial beam blocking. If the PDSCH error cause was partial beam blocking, then the UE may proceed to 345. At 345, the UE may determine to transmit uplink NACK using a beam sweep and then proceed to 335. At 335, the UE may transmit the NACK in a PUCCH, and in some cases, the NACK may also include a PDSCH error cause IE that identifies the determined error cause for the base station. In some examples, the UE may also transmit a measurement report such as a CSI-RS report or an error cause measurement report. If the PDSCH error cause was not the UE being out of coverage, complete beam blocking, or partial beam blocking, then the UE may proceed to 355.

At 355, the UE may check if the PDSCH error cause was interference. If the PDSCH error cause was interference, then the UE may proceed to 360. At 360, the UE may follow the UE method upon PDSCH error cause: interference and then proceed to 335. For example, the UE may determine to transmit a single beam PUCCH NACK transmission without uplink beam sweeping on a reciprocal uplink beam to the beam used for the PDSCH, which may include an indication of the PDSCH error cause as being interference. At 335, the UE may transmit the NACK in a PUCCH, and in some cases, the NACK may also include a PDSCH error cause IE that identifies the determined error cause for the base station. In some examples, the UE may also transmit a measurement report such as a CSI-RS report or an error cause measurement report. If the PDSCH error cause was not the UE being out of coverage, complete beam blocking, partial beam blocking, or interference, then the UE may proceed to 365.

At 365, the UE may check if the PDSCH error cause was frequency selective fading. If the PDSCH error cause was frequency selective fading, then the UE may proceed to 370. At 370, the UE may follow the UE method upon PDSCH error cause: frequency selective fading and then proceed to 335. For example, the UE may determine to transmit a single beam PUCCH NACK transmission without uplink beam sweeping on a reciprocal uplink beam to the beam used for the PDSCH, which may include an indication of the PDSCH error cause as being interference. In some cases, the NACK is repeated (e.g., twice or three times) in the frequency domain. At 335, the UE may transmit the NACK in a PUCCH, and in some cases, the NACK may also include a PDSCH error cause IE that identifies the determined error cause for the base station. In some examples, the UE may also transmit a measurement report such as a CSI-RS report or an error cause measurement report. If the PDSCH error cause was not the UE being out of coverage, complete beam blocking, partial beam blocking, interference, or frequency selective fading, then the UE may proceed to 375.

At 375, the UE may determine that the PDSCH error cause is not detected. If the PDSCH error cause was not detected, then the UE may proceed to 345. At 345, the UE may determine to transmit uplink NACK using a beam sweep and then proceed to 335. At 335, the UE may transmit the NACK in a PUCCH, and in some cases, the NACK may also include a PDSCH error cause IE that identifies the determined error cause for the base station. In some examples, the UE may also transmit a measurement report such as a CSI-RS report or an error cause measurement report.

In some cases, a UE may perform a subset of the actions of the error cause detection protocol described herein. For example, in a sparse deployment of a few cells with no dynamic TDD and no other cell interference, the UE may activate out of coverage check at 325 and beam blocking PDSCH error cause measurements at 340 and 350, and the UE may deactivate the interference check at 355 and frequency selective fading check at 365. In another example, in a very dense deployment of cells, which may have good coverage and lack holes in coverage, the UE may skip the out of coverage check at 325 and continue checks at 340, 350, 355, and 365 based on the assumption of good coverage in dense deployment areas. In another example, the UE methods for error cause of interference at 360 or fast fading at 370 may be activated when the UE battery level is below a power threshold. Additionally or alternatively, the UE methods for error cause of interference at 360 or fast fading at 370 may be activated when an uplink load is higher than a load threshold. Additionally or alternatively, the UE methods for error cause of interference at 360 or fast fading at 370 may be activated when cross link interference at other UEs is detected and reported to the UE performing the error cause detection.

Figure 4:
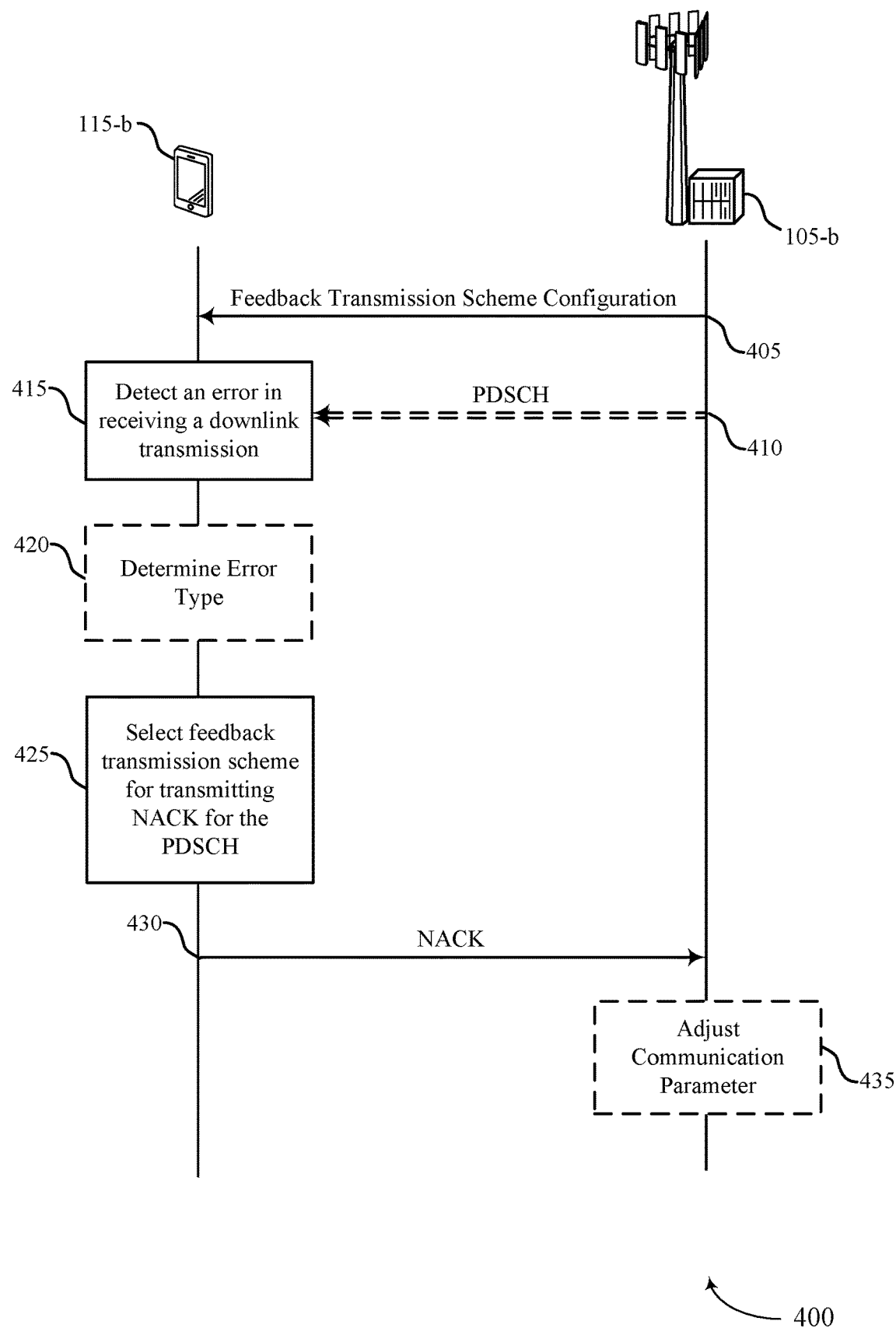
FIG. 4 illustrates an example of a process flow that supports using a configured negative acknowledgement transmission scheme for error cause indication in accordance with aspects of the present disclosure.

FIG. 4 illustrates an example of a process flow 400 that supports using a configured negative acknowledgement transmission scheme for error cause indication in accordance with aspects of the present disclosure. In some examples, process flow 400 may implement aspects of wireless communications system 100. Process flow 400 is shown as being implemented by a UE 115-*b*, which may be an example of the UEs 115 as described with respect to FIGS. 1 and 2. For example, UE 115-*b* may be an example of UE 115-*a* of FIG. 2. Process flow 400 is also shown as being implemented by base station 105-*b*, which may be an example of the base stations 105 as described with respect to FIGS. 1 and 2. For example, base station 105-*b* may be an example of base station 105-*a* of FIG. 2.

In the following description of the process flow 400, the operations of UE 115-*b* and base station 105-*b* may occur in a different order than the exemplary order shown. Certain illustrated operations may also be left out of the process flow 400, or other operations may be added to the process flow 400. It is to be understood that while UE 115-*b* and base station 105-*b* are shown performing a number of the operations of process flow 400, any wireless device may perform the operations shown.

At 405, base station 105-*b* may transmit and UE 115-*b* may receive a configuration indicating a feedback transmission scheme for reporting feedback associated with an error type. In some cases, the configuration may be conveyed in an RRC message, which may include an IE for reporting feedback associated with error detection.

At 410, base station 105-*b* may transmit a downlink transmission such as a PDSCH. In some examples, the PDSCH may be transmitted via a plurality of beams in a multi-TRP configuration.

At 415, UE 115-*b* may attempt to perform a decoding process on a least one of a plurality of downlink transmissions transmitted via a respective plurality of transmission beams, which may include UE 115-*b* detecting an error in receiving the downlink transmission where the detected error is of the error type. In some cases, UE 115-*b* may determine to perform a subset of an error cause protocol based at least in part on network deployment density, UE battery level, UE uplink load, or cross link interference detection. For example, the subset of the error cause protocol may include one or both of an interference check and a frequency fading check based at least in part on the UE battery level being below a battery threshold. In another example, the subset of the error cause protocol may include one or both of an interference check and a frequency fading check based at least in part on the UE uplink load being above an uplink load threshold. In yet another example, the subset of the error cause protocol may include one or both of an interference check and a frequency fading check based at least in part on the cross link interference detection at an additional UE.

At 420, UE 115-*b* may determine what caused the error at 415. For example, UE 115-*b* may determine that the UE 115-*b* is out of coverage of the base station 105-*b* during the downlink transmission at 410, and thus, the error type is an out of coverage error type. In some cases, UE 115-*b* may determine that a transmit beam is completely blocked during the downlink transmission at 410, and thus, the error type is a complete beam blocking error type. The UE 115-*b* may determine that the transmit beam is completely blocked during the downlink transmission in response to an absence of an out of coverage error type for the downlink transmission. In some cases, UE 115-*b* may determine that a transmit beam is partially blocked during the downlink transmission, and thus, the error type is a partial beam blocking error type. The UE 115-*b* may determine that the transmit beam is partially blocked during the downlink transmission in response to an absence of an out of coverage error type for the downlink transmission and an absence of a complete beam blocking error type for the downlink transmission.

In some examples, UE 115-*b* may determine that interference is present during the downlink transmission, and the error type comprises an interference error type. This determining that interference is present during the downlink transmission may be in response to an absence of an out of coverage error type for the downlink transmission, an absence of a complete beam blocking error type for the downlink transmission, and an absence of a partial beam blocking error type for the downlink transmission. In some cases, the UE 115-*b* may determine that frequency selective fading is present during the downlink transmission, and that the error type is a frequency selective fading error type. This determination that frequency selective fading is present during the downlink transmission may be in response to an absence of an out of coverage error type for the downlink transmission, an absence of a complete beam blocking error type for the downlink transmission, an absence of a partial beam blocking error type for the downlink transmission, and an absence of an interference error type for the downlink transmission. In yet another example, UE 115-*b* may determine that a cause of error for the downlink transmission is unknown is in response to an absence of an out of coverage error type for the downlink transmission, an absence of a complete beam blocking error type for the downlink transmission, an absence of a partial beam blocking error type for the downlink transmission, an absence of an interference error type for the downlink transmission, and an absence of a frequency selective fading. Thus, the error type is an unknown error type.

At 425, UE 115-*b* may select the feedback transmission scheme for transmitting a NACK message for the downlink transmission based at least in part on the detected error being of the error type and the configuration. For example, UE 115-*b* may determine to perform beam sweeping for transmitting the NACK message and error cause information to the base station 105-*b* based at least in part on the out of coverage error type and the configuration from 405. In some examples, UE 115-*b* may determine to perform beam sweeping for transmitting the NACK and error cause information based at least in part on the complete beam blocking error type and the configuration from 405. In some cases, UE 115-*b* may determine to perform beam sweeping for transmitting the NACK and error cause information based at least in part on the partial beam blocking error type and the configuration.

In other examples, UE 115-*b* may determine to transmit, via an uplink beam without beam sweeping, the NACK and error cause information based at least in part on the interference error type and the configuration from 405. In some cases, UE 115-*b* may determine to transmit, via an uplink beam, a plurality of repetitions of the NACK and error cause information based at least in part on the frequency selective fading error type and the configuration from 405. UE 115-*b* may determine the plurality of repetitions to transmit based at least in part on the configuration from 405 where the plurality of repetitions is in the frequency domain.

In some cases, UE 115-*b* may determine to perform beam sweeping for transmitting the NACK and error cause information based at least in part on the unknown error type and the configuration from 405.

At 430, UE 115-*b* may transmit and base station 105-*b* may receive the NACK message for the downlink transmission at 410 using the selected feedback transmission scheme. In some cases, the UE 115-*b* may transmit and base station 105-*b* may receive error cause information in connection with the NACK, where the error cause information indicates the error type determined from 415 and 420.

At 435, base station 105-*b* may adapt one or more radio link parameters (e.g., MCS or TCI state) based at least in part on receiving the error cause information in connection with the NACK.

Figure 5:
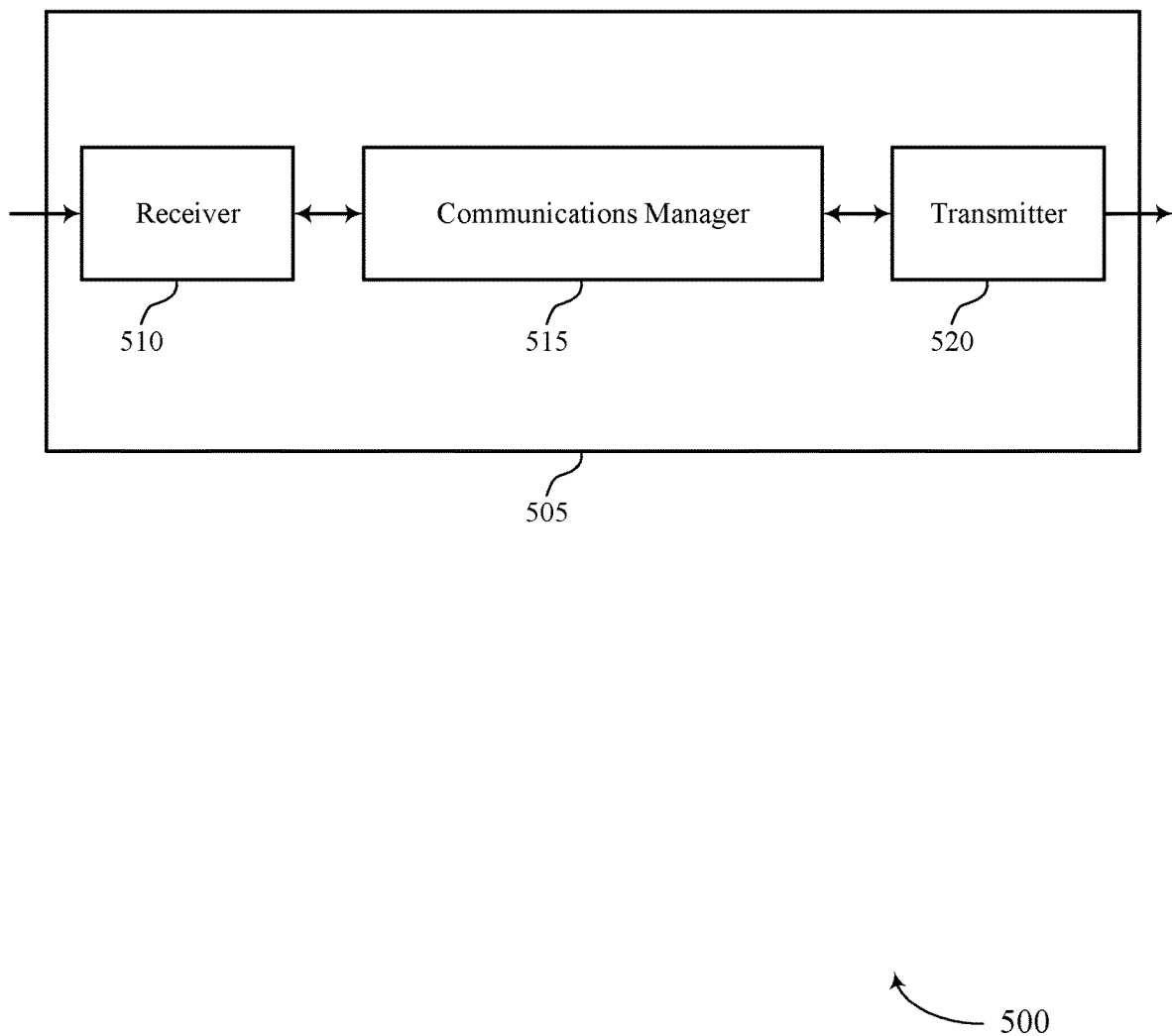
FIGS. 5 and 6 show block diagrams of devices that support using a configured negative acknowledgement transmission scheme for error cause indication in accordance with aspects of the present disclosure.

FIG. 5 shows a block diagram 500 of a device 505 that supports using a configured NACK transmission scheme for error cause indication in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to using a configured NACK transmission scheme for error cause indication, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration indicating a feedback transmission scheme for reporting feedback associated with an error type, detect an error in receiving a downlink transmission, wherein the detected error is of the error type, select the feedback transmission scheme for transmitting a NACK message for the downlink transmission based at least in part on the detected error being of the error type and the configuration, and transmit the NACK message for the downlink transmission using the selected feedback transmission scheme. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for increased efficiency in NACK feedback transmissions. For example, determining an error cause may enable the device 505 to report feedback according to an appropriate transmission scheme, thereby reducing unnecessary power consumption at the device 505.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
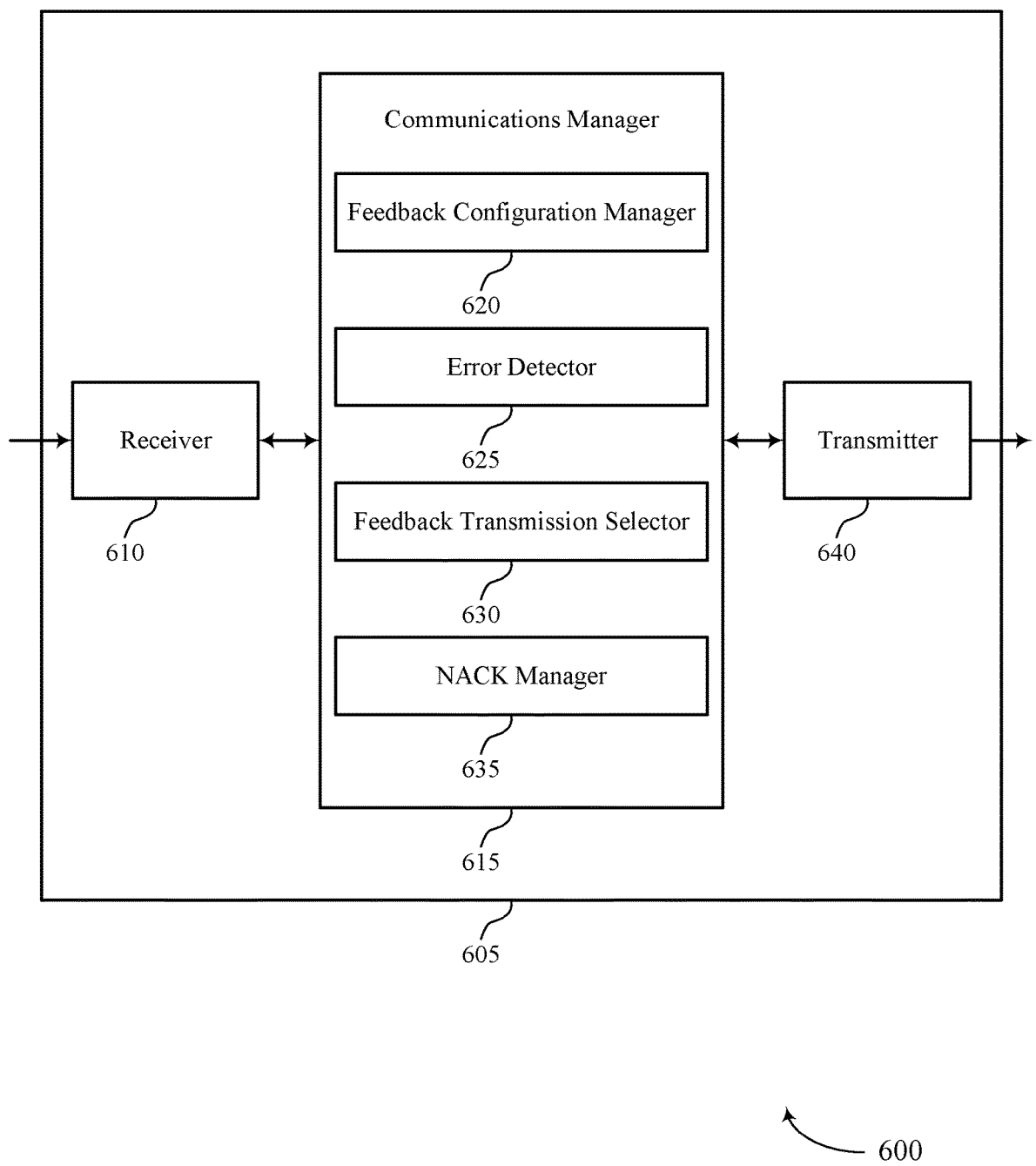

FIG. 6 shows a block diagram 600 of a device 605 that supports using a configured NACK transmission scheme for error cause indication in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to using a configured NACK transmission scheme for error cause indication, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a feedback configuration manager 620, an error detector 625, a feedback transmission selector 630, and a NACK manager 635. The communications manager 615 may be an example of aspects of the communications manager 810 described herein.

The feedback configuration manager 620 may receive a configuration indicating a feedback transmission scheme for reporting feedback associated with an error type.

The error detector 625 may detect an error in receiving a downlink transmission, wherein the detected error is of the error type.

The feedback transmission selector 630 may select the feedback transmission scheme for transmitting a NACK message for the downlink transmission based at least in part on the detected error being of the error type and the configuration.

The NACK manager 635 may transmit the NACK message for the downlink transmission using the selected feedback transmission scheme.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
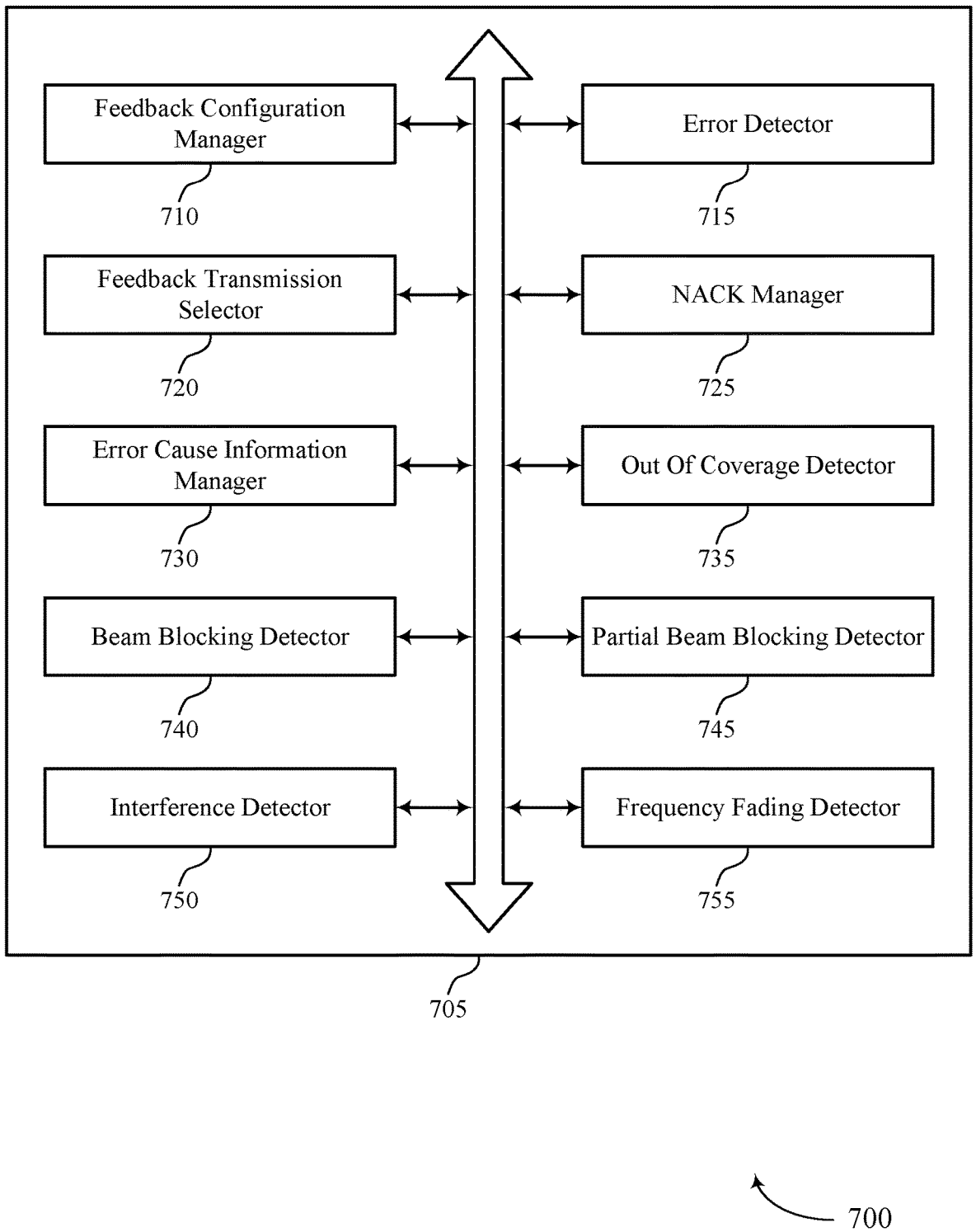
FIG. 7 shows a block diagram of a communications manager that supports using a configured negative acknowledgement transmission scheme for error cause indication in accordance with aspects of the present disclosure.

FIG. 7 shows a block diagram 700 of a communications manager 705 that supports using a configured NACK transmission scheme for error cause indication in accordance with aspects of the present disclosure. The communications manager 705 may be an example of aspects of a communications manager 515, a communications manager 615, or a communications manager 810 described herein. The communications manager 705 may include a feedback configuration manager 710, an error detector 715, a feedback transmission selector 720, a NACK manager 725, an error cause information manager 730, an out of coverage detector 735, a beam blocking detector 740, a partial beam blocking detector 745, an interference detector 750, and a frequency fading detector 755. Each of these modules may communicate, directly or indirectly, with one another (e.g., via one or more buses).

The feedback configuration manager 710 may receive a configuration indicating a feedback transmission scheme for reporting feedback associated with an error type. In some examples, the feedback configuration manager 710 may determine to perform a subset of an error cause protocol based at least in part on network deployment density, UE battery level, UE uplink load, or cross link interference detection. In some examples, the feedback configuration manager 710 may receive an RRC message including an IEIE for reporting feedback associated with error detection. In some cases, the subset of the error cause protocol includes one or both of an interference check and a frequency fading check based at least in part on the UE battery level being below a battery threshold. In some cases, the subset of the error cause protocol includes one or both of an interference check and a frequency fading check based at least in part on the UE uplink load being above an uplink load threshold. In some cases, the subset of the error cause protocol includes one or both of an interference check and a frequency fading check based at least in part on the cross link interference detection at an additional UE.

The error detector 715 may detect an error in receiving a downlink transmission, wherein the detected error is of the error type. In some examples, determining a cause of error for the downlink transmission is unknown is in response to an absence of an out of coverage error type for the downlink transmission, an absence of a complete beam blocking error type for the downlink transmission, an absence of a partial beam blocking error type for the downlink transmission, an absence of an interference error type for the downlink transmission, and an absence of a frequency selective fading, wherein the error type includes an unknown error type.

The feedback transmission selector 720 may select the feedback transmission scheme for transmitting a NACK message for the downlink transmission based at least in part on the detected error being of the error type and the configuration. In some examples, the feedback transmission selector 720 may determine to perform beam sweeping for transmitting the NACK message and error cause information to the base station based at least in part on the out of coverage error type and the configuration. In some examples, the feedback transmission selector 720 may determine to perform beam sweeping for transmitting the NACK message and error cause information based at least in part on the complete beam blocking error type and the configuration. In some examples, the feedback transmission selector 720 may determine to perform beam sweeping for transmitting the NACK message and error cause information based at least in part on the partial beam blocking error type and the configuration. In some examples, the feedback transmission selector 720 may determine to transmit, via an uplink beam without beam sweeping, the NACK message and error cause information based at least in part on the interference error type and the configuration. In some examples, the feedback transmission selector 720 may determine to transmit, via an uplink beam, a plurality of repetitions of the NACK message and error cause information based at least in part on the frequency selective fading error type and the configuration. In some examples, the feedback transmission selector 720 may determine the plurality of repetitions to transmit based at least in part on the configuration, wherein the plurality of repetitions is in the frequency domain. In some examples, the feedback transmission selector 720 may determine to perform beam sweeping for transmitting the NACK message and error cause information based at least in part on the unknown error type and the configuration.

The NACK manager 725 may transmit the NACK message for the downlink transmission using the selected feedback transmission scheme.

The error cause information manager 730 may transmit error cause information in connection with the NACK, wherein the error cause information indicates the error type.

The out of coverage detector 735 may determine that the UE is out of coverage of the base station during the downlink transmission, wherein the error type includes an out of coverage error type.

The beam blocking detector 740 may determine that a transmit beam is completely blocked during the downlink transmission, wherein the error type includes a complete beam blocking error type. In some examples, the beam blocking detector 740 may determine that the transmit beam is completely blocked during the downlink transmission is in response to an absence of an out of coverage error type for the downlink transmission.

The partial beam blocking detector 745 may determine that a transmit beam is partially blocked during the downlink transmission, wherein the error type includes a partial beam blocking error type. In some examples, the partial beam blocking detector 745 may determine that the transmit beam is partially blocked during the downlink transmission is in response to an absence of an out of coverage error type for the downlink transmission and an absence of a complete beam blocking error type for the downlink transmission.

The interference detector 750 may determine that interference is present during the downlink transmission, wherein the error type includes an interference error type. In some examples, the interference detector 750 may determine that interference is present during the downlink transmission is in response to an absence of an out of coverage error type for the downlink transmission, an absence of a complete beam blocking error type for the downlink transmission, and an absence of a partial beam blocking error type for the downlink transmission.

The frequency fading detector 755 may determine that frequency selective fading is present during the downlink transmission, wherein the error type includes a frequency selective fading error type. In some examples, the frequency fading detector 755 may determine that frequency selective fading is present during the downlink transmission is in response to an absence of an out of coverage error type for the downlink transmission, an absence of a complete beam blocking error type for the downlink transmission, an absence of a partial beam blocking error type for the downlink transmission, and an absence of an interference error type for the downlink transmission.

Figure 8:
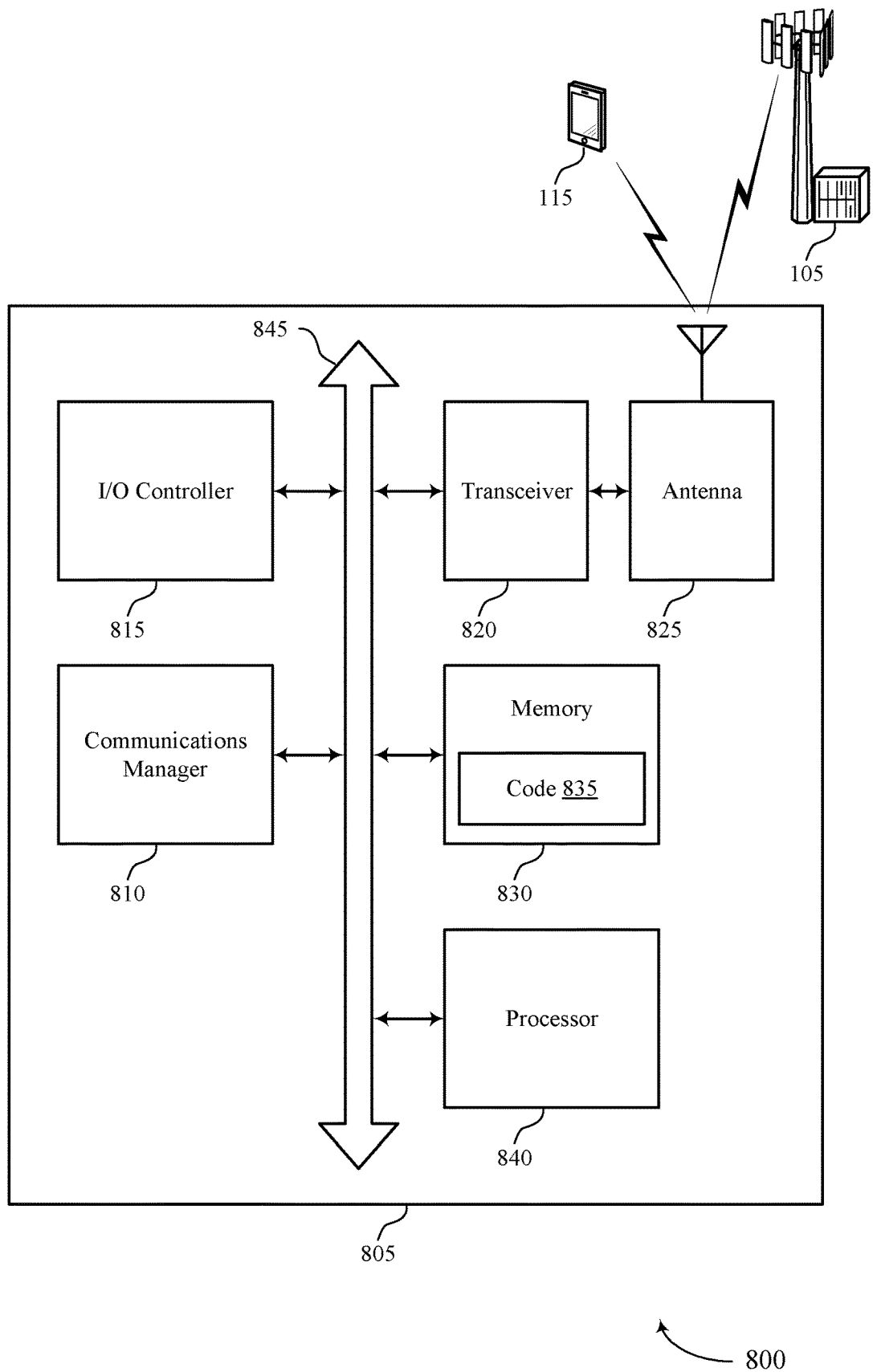
FIG. 8 shows a diagram of a system including a device that supports using a configured negative acknowledgement transmission scheme for error cause indication in accordance with aspects of the present disclosure.

FIG. 8 shows a diagram of a system 800 including a device 805 that supports using a configured NACK transmission scheme for error cause indication in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration indicating a feedback transmission scheme for reporting feedback associated with an error type, detect an error in receiving a downlink transmission, wherein the detected error is of the error type, select the feedback transmission scheme for transmitting a NACK message for the downlink transmission based at least in part on the detected error being of the error type and the configuration, and transmit the NACK message for the downlink transmission using the selected feedback transmission scheme.

By including or configuring the communications manager 810 in accordance with examples as described herein, the device 805 may support techniques for optimized link adaptation by reporting error cause information. The device 805 and a base station may perform link adaptation procedures based on the specific error cause reported by the device 805, thereby avoiding extraneous actions (e.g., beam sweeping) at the device 805. Additionally, the device 805 may report NACK via a transmission scheme associated with the error cause. For instance, the device 805 may reduce uplink beam sweeping, which may in turn increase efficiency in resource utilization and power consumption at the device 805.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting using a configured NACK transmission scheme for error cause indication).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
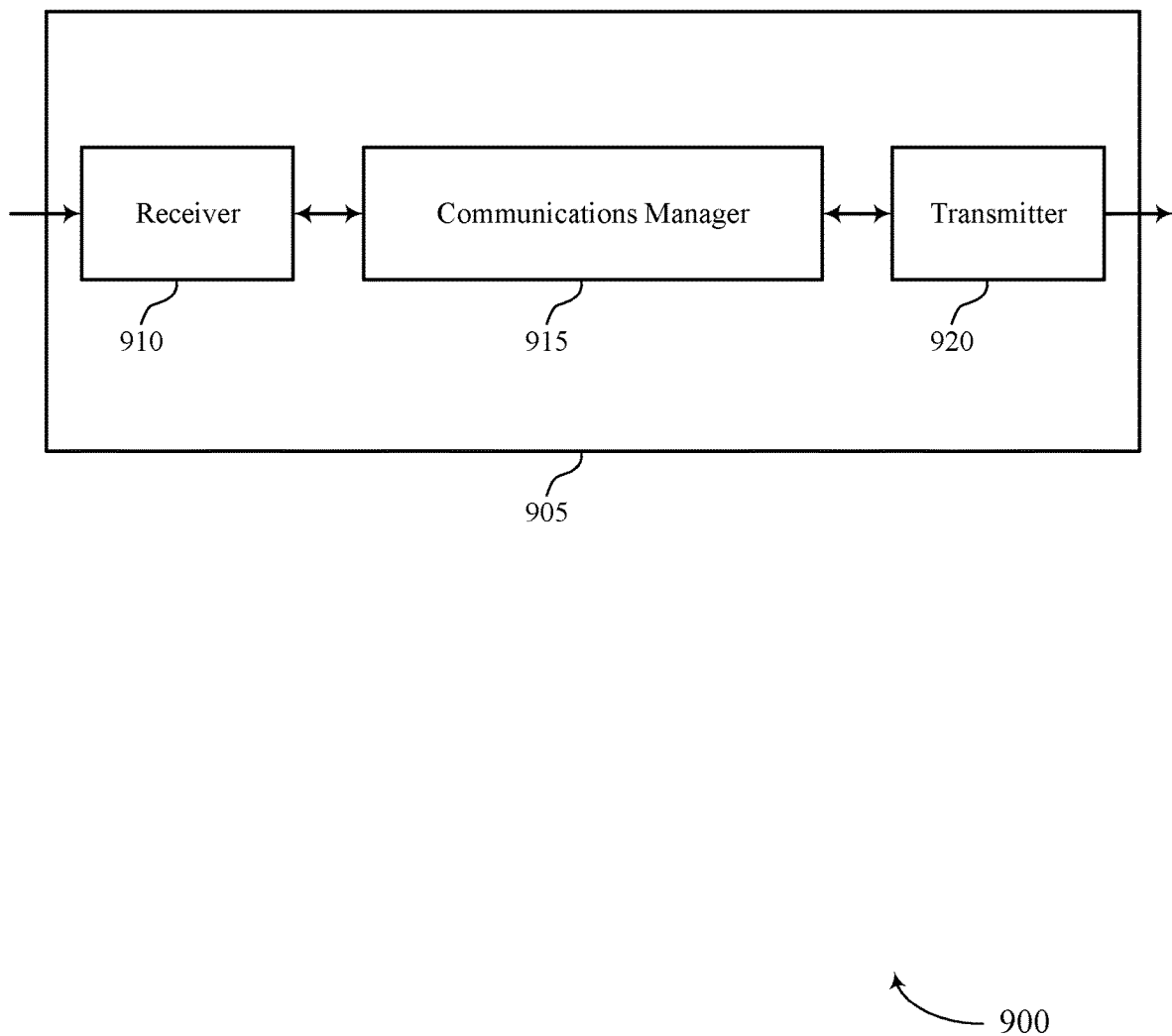
FIGS. 9 and 10 show block diagrams of devices that support using a configured negative acknowledgement transmission scheme for error cause indication in accordance with aspects of the present disclosure.

FIG. 9 shows a block diagram 900 of a device 905 that supports using a configured NACK transmission scheme for error cause indication in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to using a configured NACK transmission scheme for error cause indication, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a configuration indicating a feedback transmission scheme for reporting feedback associated with an error type, transmit a downlink transmission, and receive a NACK message for the downlink transmission via a feedback transmission scheme based at least in part on the configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 915 in accordance with examples as described herein, the device 905 (e.g., a processor controlling or otherwise coupled to the receiver 910, the transmitter 920, the communications manager 915, or a combination thereof) may support techniques for increased efficiency in NACK feedback transmissions. The device 905 may receive NACK feedback from a UE according to a transmission scheme associated with an error cause, thereby avoiding extraneous actions (e.g., beam sweeping) at the UE and increasing efficiency in resource utilization. Additionally, receiving NACK feedback based on the error cause may enable the device 905 to perform link adaptation procedures optimized according to the error cause, which may reduce latency at the device 905.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
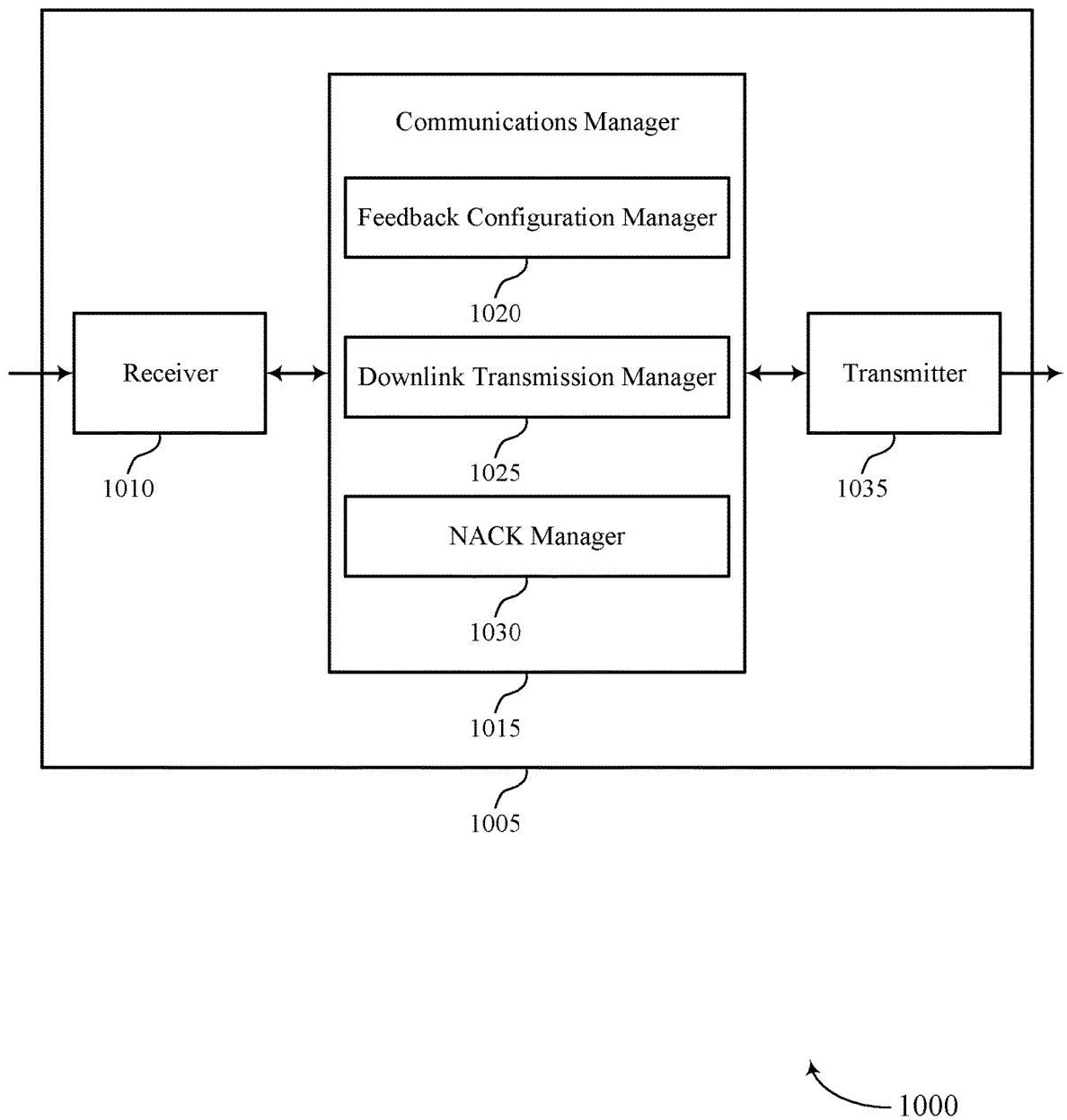

FIG. 10 shows a block diagram 1000 of a device 1005 that supports using a configured NACK transmission scheme for error cause indication in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to using a configured NACK transmission scheme for error cause indication, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a feedback configuration manager 1020, a downlink transmission manager 1025, and a NACK manager 1030. The communications manager 1015 may be an example of aspects of the communications manager 1210 described herein.

The feedback configuration manager 1020 may transmit a configuration indicating a feedback transmission scheme for reporting feedback associated with an error type.

The downlink transmission manager 1025 may transmit a downlink transmission.

The NACK manager 1030 may receive a NACK message for the downlink transmission via a feedback transmission scheme based at least in part on the configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
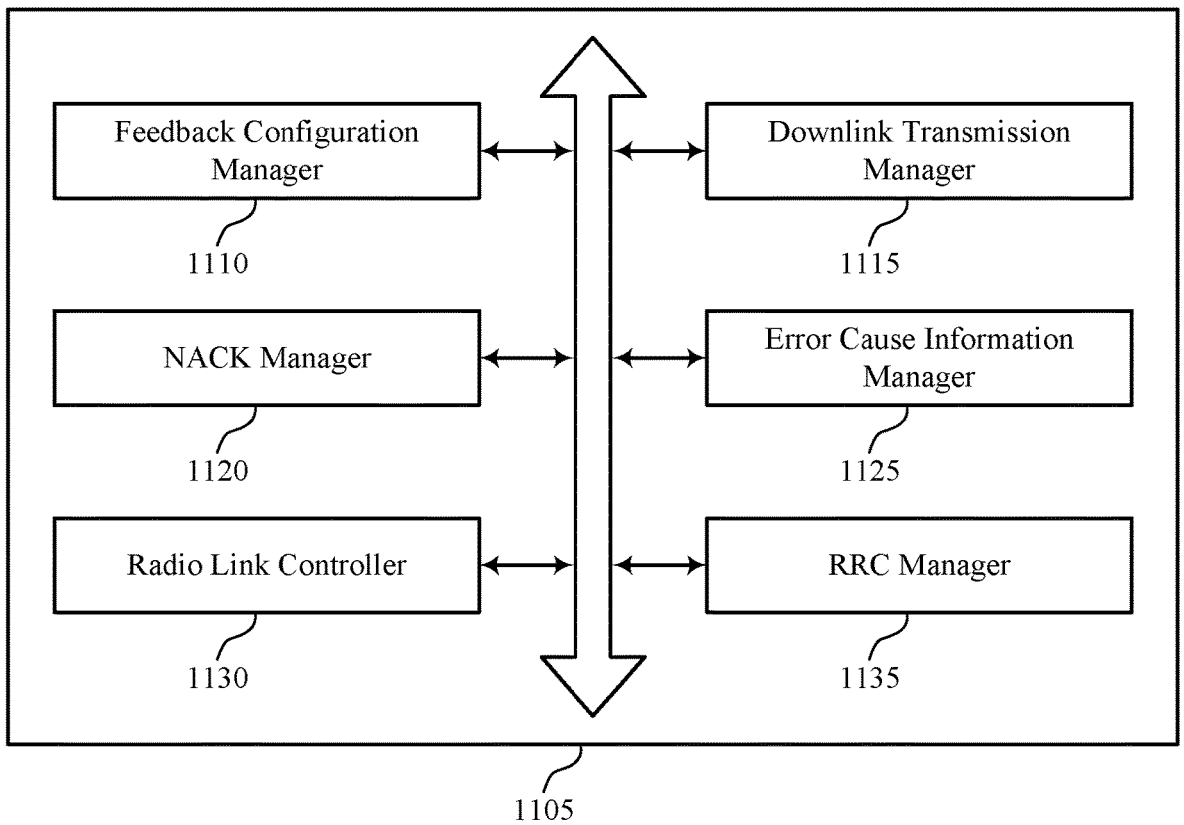
FIG. 11 shows a block diagram of a communications manager that supports using a configured negative acknowledgement transmission scheme for error cause indication in accordance with aspects of the present disclosure.

FIG. 11 shows a block diagram 1100 of a communications manager 1105 that supports using a configured NACK transmission scheme for error cause indication in accordance with aspects of the present disclosure. The communications manager 1105 may be an example of aspects of a communications manager 915, a communications manager 1015, or a communications manager 1210 described herein. The communications manager 1105 may include a feedback configuration manager 1110, a downlink transmission manager 1115, a NACK manager 1120, an error cause information manager 1125, a radio link controller 1130, and an RRC manager 1135. Each of these modules may communicate, directly or indirectly, with one another (e.g., via one or more buses).

The feedback configuration manager 1110 may transmit a configuration indicating a feedback transmission scheme for reporting feedback associated with an error type. In some cases, the configuration indicates to perform a beam sweep as the feedback transmission scheme based at least in part on an out of coverage error type. In some cases, the configuration indicates to perform a beam sweep as the feedback transmission scheme based at least in part on a complete beam blocking error type. In some cases, the configuration indicates to perform a beam sweep as the feedback transmission scheme based at least in part on a partial beam blocking error type. In some cases, the configuration indicates to transmit via an uplink beam without beam sweeping as the feedback transmission scheme based at least in part on an interference error type. In some cases, the configuration indicates to transmit via an uplink beam without beam sweeping as the feedback transmission scheme based at least in part on a frequency selective fading error type. In some cases, the configuration indicates a plurality of repetitions in the frequency domain to transmit based at least in part on the frequency selective fading error type. In some cases, the configuration indicates to perform a beam sweep as the feedback transmission scheme based at least in part on an unknown error type.

The downlink transmission manager 1115 may transmit a downlink transmission.

The NACK manager 1120 may receive a NACK message for the downlink transmission via a feedback transmission scheme based at least in part on the configuration.

The error cause information manager 1125 may receive error cause information in connection with the NACK, wherein the error cause information indicates the error type.

The radio link controller 1130 may adapt radio link parameters based at least in part on receiving the error cause information in connection with the NACK.

The RRC manager 1135 may transmit an RRC message including an IE for reporting feedback associated with error detection.

Figure 12:
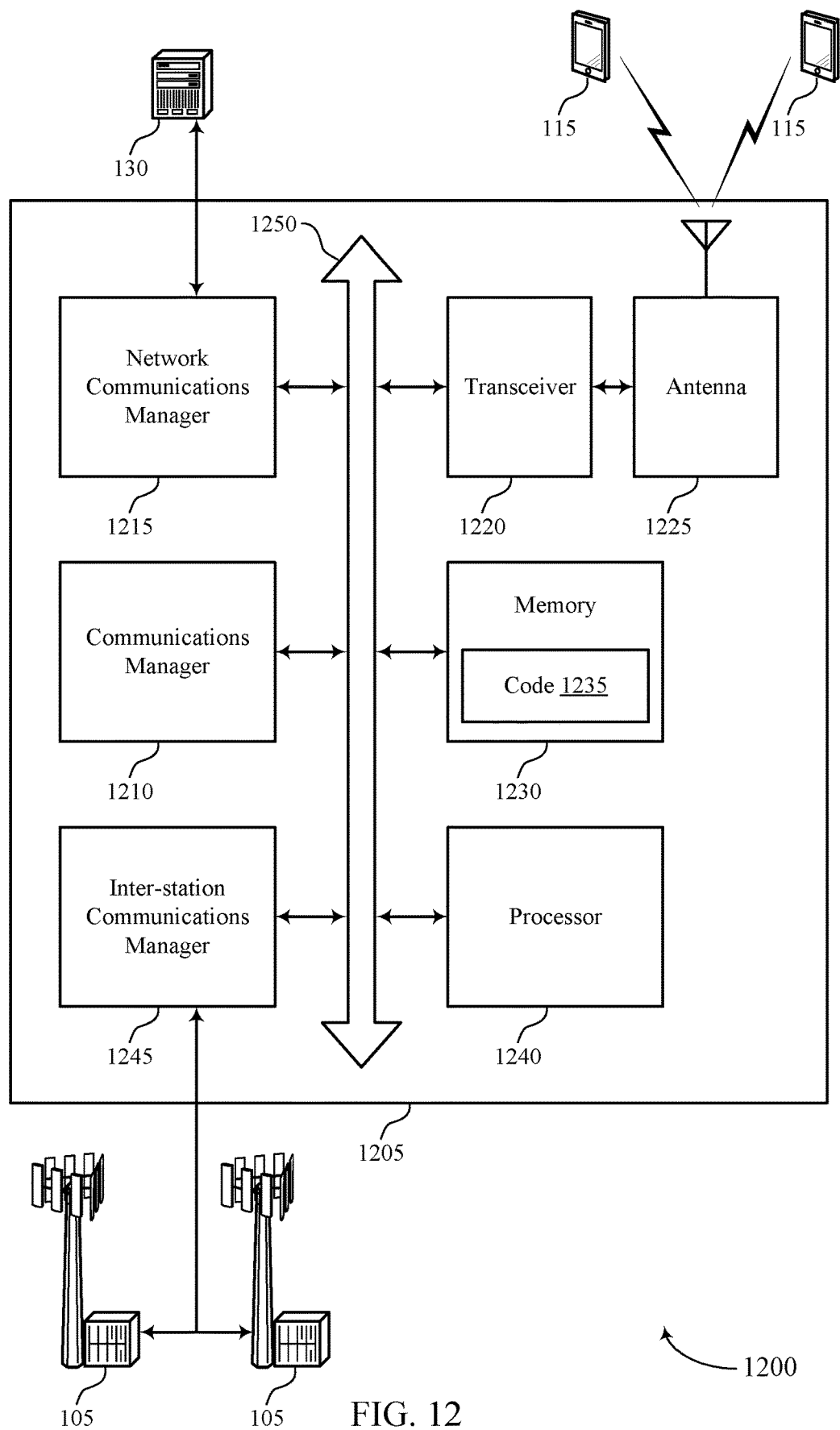
FIG. 12 shows a diagram of a system including a device that supports using a configured negative acknowledgement transmission scheme for error cause indication in accordance with aspects of the present disclosure.

FIG. 12 shows a diagram of a system 1200 including a device 1205 that supports using a configured NACK transmission scheme for error cause indication in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a configuration indicating a feedback transmission scheme for reporting feedback associated with an error type, transmit a downlink transmission, and receive a NACK message for the downlink transmission via a feedback transmission scheme based at least in part on the configuration.

By including or configuring the communications manager 1220 in accordance with examples as described herein, the device 1205 may support techniques for optimized link adaptation by reporting error cause information. The device 1205 may perform link adaptation procedures based on the specific error cause reported by a UE, thereby avoiding extraneous actions (e.g., beam sweeping) at the UE. Additionally, the device 1205 may reduce system latency and increase communications efficiency by receiving feedback from the UE based on the error cause. For instance, the device 1205 may receive a NACK from a UE using a single uplink beam (e.g., instead of beam sweeping), which may increase efficiency in resource utilization and reduce latency.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting using a configured NACK transmission scheme for error cause indication).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
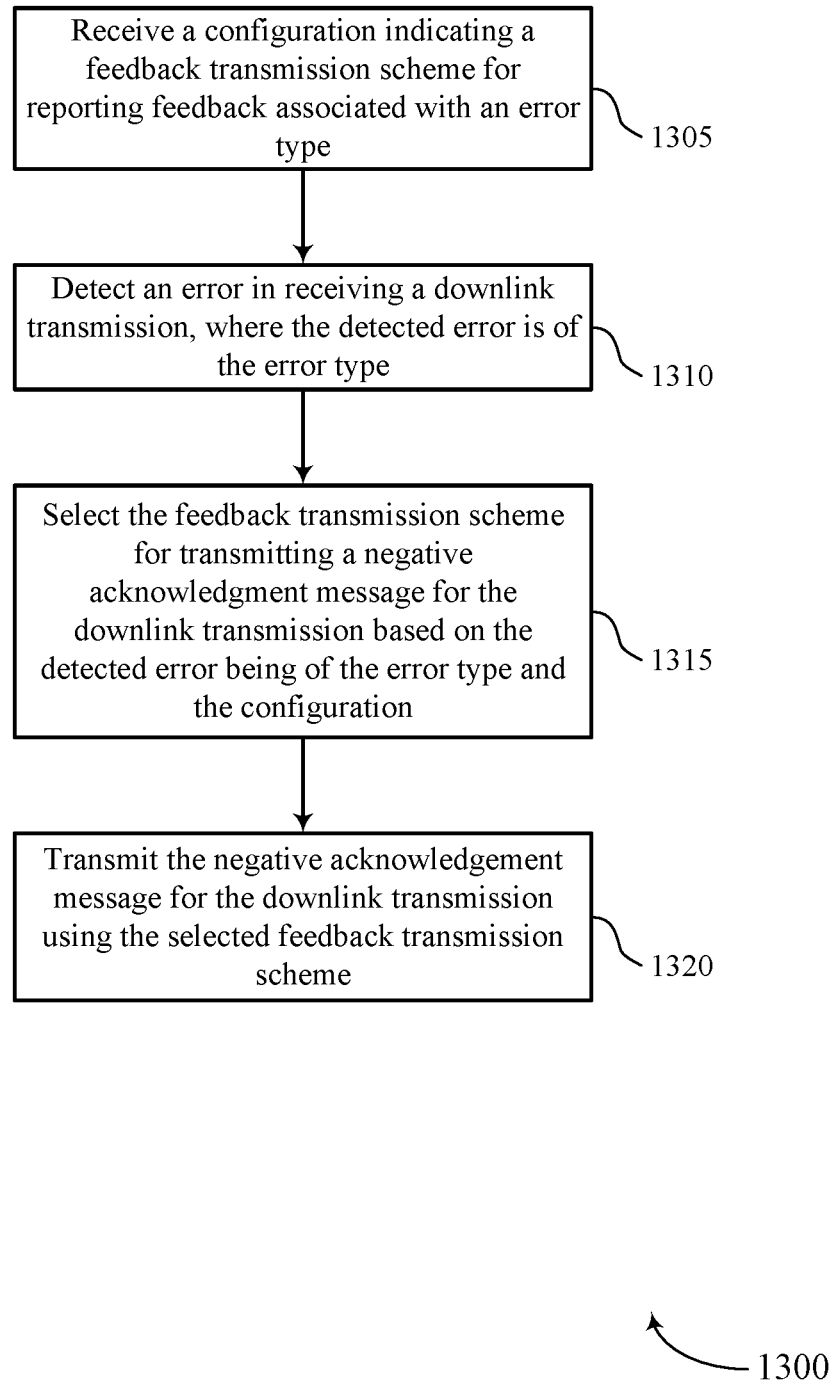
FIGS. 13 through 19 show flowcharts illustrating methods that support using a configured negative acknowledgement transmission scheme for error cause indication in accordance with aspects of the present disclosure.

FIG. 13 shows a flowchart illustrating a method 1300 that supports using a configured NACK transmission scheme for error cause indication in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration indicating a feedback transmission scheme for reporting feedback associated with an error type. The operations of 1305 may be performed according to the methods described herein. In some examples, aspects of the operations of 1305 may be performed by a feedback configuration manager as described with reference to FIGS. 5 through 8.

At 1310, the UE may detect an error in receiving a downlink transmission, wherein the detected error is of the error type. The operations of 1310 may be performed according to the methods described herein. In some examples, aspects of the operations of 1310 may be performed by an error detector as described with reference to FIGS. 5 through 8.

At 1315, the UE may select the feedback transmission scheme for transmitting a NACK message for the downlink transmission based at least in part on the detected error being of the error type and the configuration. The operations of 1315 may be performed according to the methods described herein. In some examples, aspects of the operations of 1315 may be performed by a feedback transmission selector as described with reference to FIGS. 5 through 8.

At 1320, the UE may transmit the NACK message for the downlink transmission using the selected feedback transmission scheme. The operations of 1320 may be performed according to the methods described herein. In some examples, aspects of the operations of 1320 may be performed by a NACK manager as described with reference to FIGS. 5 through 8.

Figure 14:
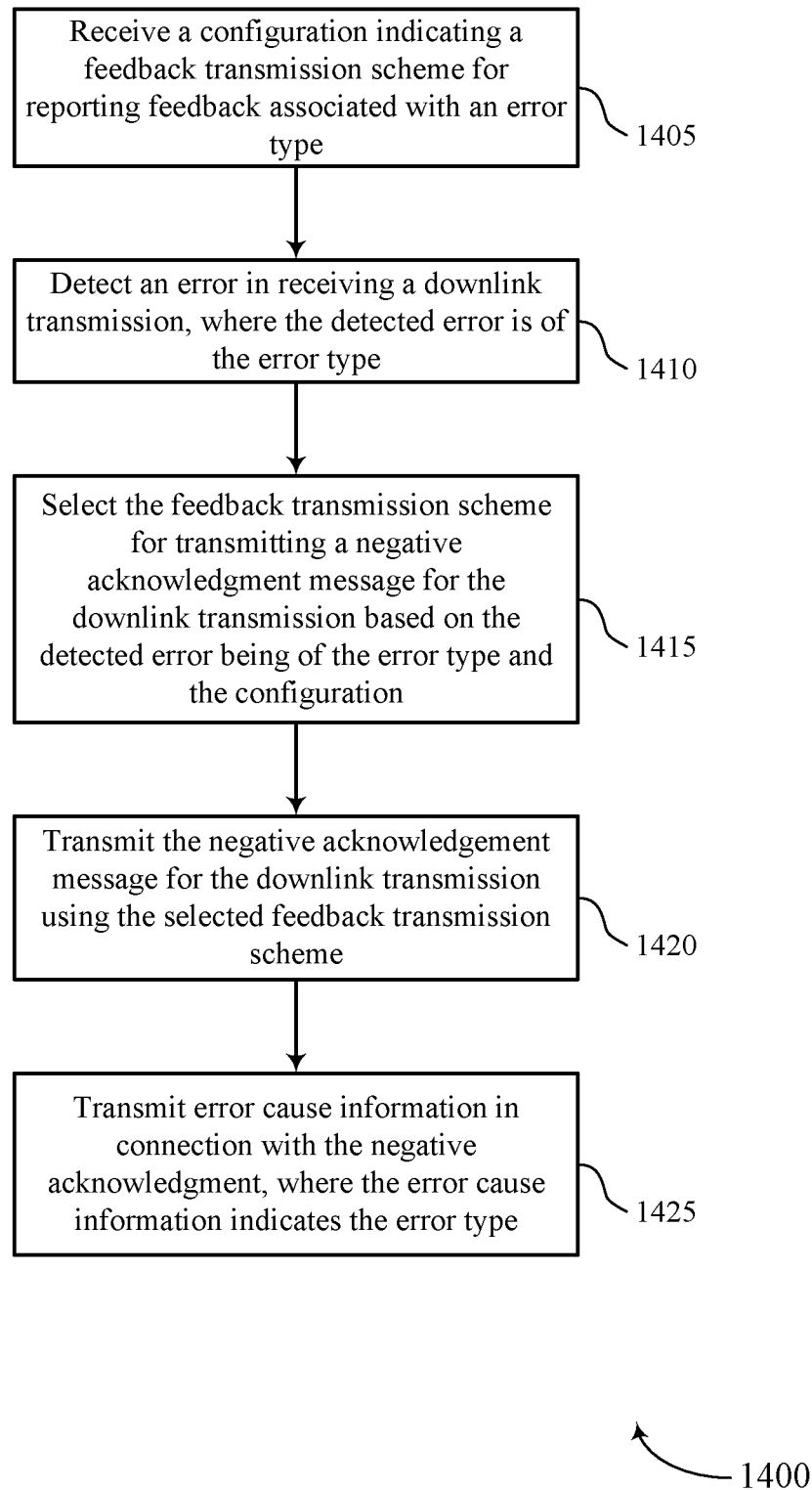

FIG. 14 shows a flowchart illustrating a method 1400 that supports using a configured NACK transmission scheme for error cause indication in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration indicating a feedback transmission scheme for reporting feedback associated with an error type. The operations of 1405 may be performed according to the methods described herein. In some examples, aspects of the operations of 1405 may be performed by a feedback configuration manager as described with reference to FIGS. 5 through 8.

At 1410, the UE may detect an error in receiving a downlink transmission, wherein the detected error is of the error type. The operations of 1410 may be performed according to the methods described herein. In some examples, aspects of the operations of 1410 may be performed by an error detector as described with reference to FIGS. 5 through 8.

At 1415, the UE may select the feedback transmission scheme for transmitting a NACK message for the downlink transmission based at least in part on the detected error being of the error type and the configuration. The operations of 1415 may be performed according to the methods described herein. In some examples, aspects of the operations of 1415 may be performed by a feedback transmission selector as described with reference to FIGS. 5 through 8.

At 1420, the UE may transmit the NACK message for the downlink transmission using the selected feedback transmission scheme. The operations of 1420 may be performed according to the methods described herein. In some examples, aspects of the operations of 1420 may be performed by a NACK manager as described with reference to FIGS. 5 through 8.

At 1425, the UE may transmit error cause information in connection with the NACK, wherein the error cause information indicates the error type. The operations of 1425 may be performed according to the methods described herein. In some examples, aspects of the operations of 1425 may be performed by an error cause information manager as described with reference to FIGS. 5 through 8.

Figure 15:
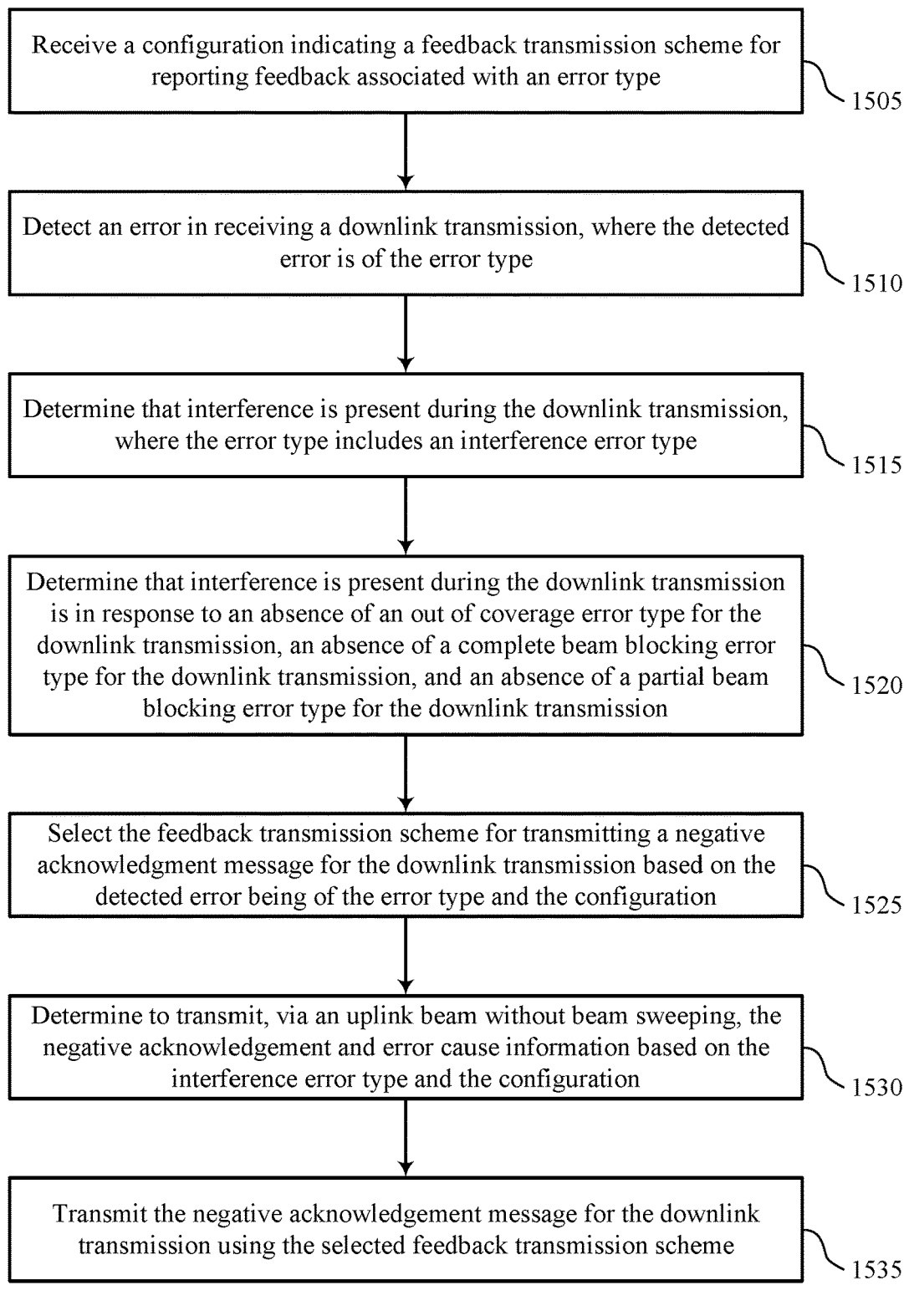

FIG. 15 shows a flowchart illustrating a method 1500 that supports using a configured NACK transmission scheme for error cause indication in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration indicating a feedback transmission scheme for reporting feedback associated with an error type. The operations of 1505 may be performed according to the methods described herein. In some examples, aspects of the operations of 1505 may be performed by a feedback configuration manager as described with reference to FIGS. 5 through 8.

At 1510, the UE may detect an error in receiving a downlink transmission, wherein the detected error is of the error type. The operations of 1510 may be performed according to the methods described herein. In some examples, aspects of the operations of 1510 may be performed by an error detector as described with reference to FIGS. 5 through 8.

At 1515, the UE may determine that interference is present during the downlink transmission, wherein the error type includes an interference error type. The operations of 1515 may be performed according to the methods described herein. In some examples, aspects of the operations of 1515 may be performed by an interference detector as described with reference to FIGS. 5 through 8.

At 1520, the UE may determine that interference is present during the downlink transmission is in response to an absence of an out of coverage error type for the downlink transmission, an absence of a complete beam blocking error type for the downlink transmission, and an absence of a partial beam blocking error type for the downlink transmission. The operations of 1520 may be performed according to the methods described herein. In some examples, aspects of the operations of 1520 may be performed by an interference detector as described with reference to FIGS. 5 through 8.

At 1525, the UE may select the feedback transmission scheme for transmitting a NACK message for the downlink transmission based at least in part on the detected error being of the error type and the configuration. The operations of 1525 may be performed according to the methods described herein. In some examples, aspects of the operations of 1525 may be performed by a feedback transmission selector as described with reference to FIGS. 5 through 8.

At 1530, the UE may determine to transmit, via an uplink beam without beam sweeping, the NACK message and error cause information based at least in part on the interference error type and the configuration. The operations of 1530 may be performed according to the methods described herein. In some examples, aspects of the operations of 1530 may be performed by a feedback transmission selector as described with reference to FIGS. 5 through 8.

At 1535, the UE may transmit the NACK message for the downlink transmission using the selected feedback transmission scheme. The operations of 1535 may be performed according to the methods described herein. In some examples, aspects of the operations of 1535 may be performed by a NACK manager as described with reference to FIGS. 5 through 8.

Figure 16:
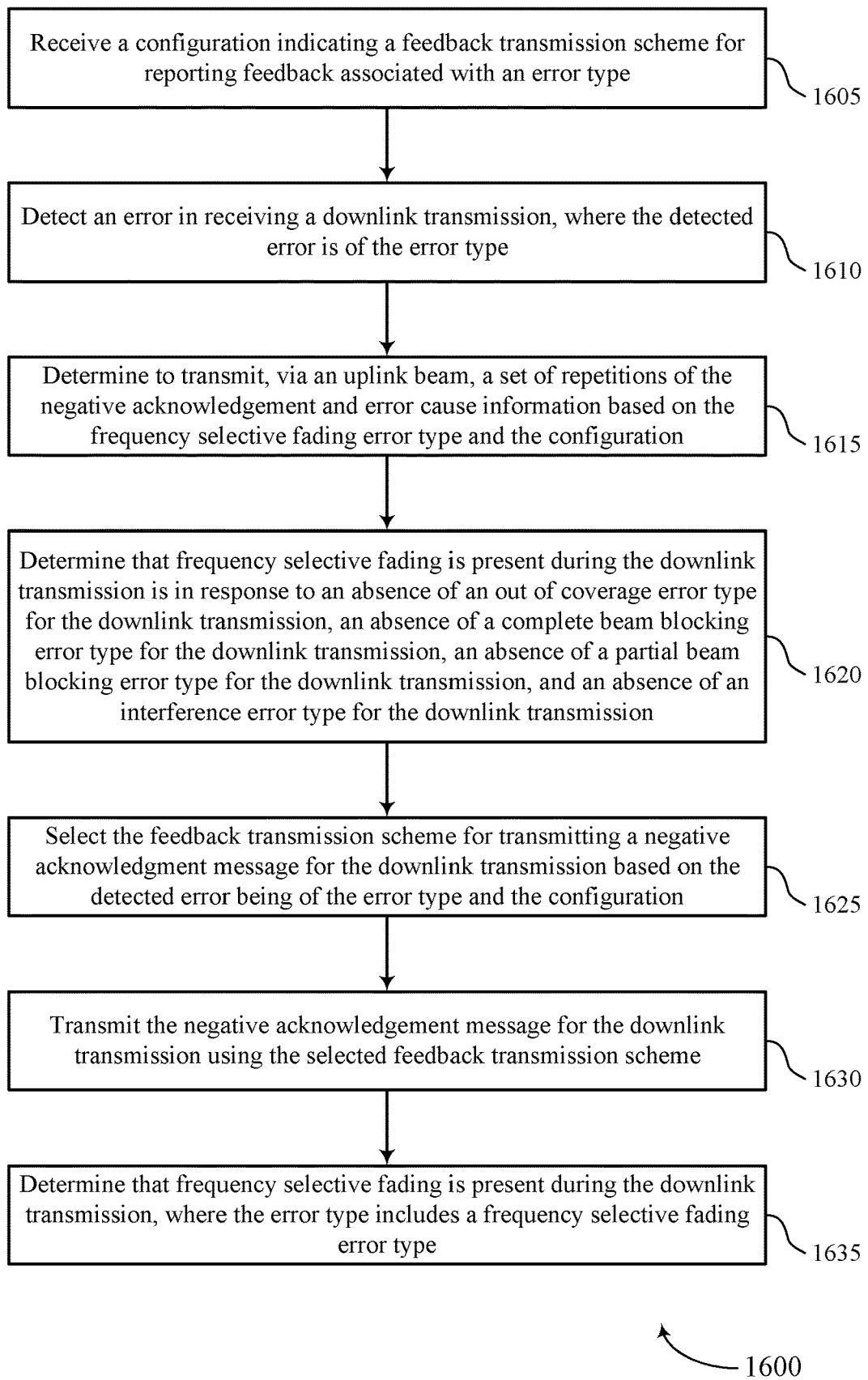

FIG. 16 shows a flowchart illustrating a method 1600 that supports using a configured NACK transmission scheme for error cause indication in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive a configuration indicating a feedback transmission scheme for reporting feedback associated with an error type. The operations of 1605 may be performed according to the methods described herein. In some examples, aspects of the operations of 1605 may be performed by a feedback configuration manager as described with reference to FIGS. 5 through 8.

At 1610, the UE may detect an error in receiving a downlink transmission, wherein the detected error is of the error type. The operations of 1610 may be performed according to the methods described herein. In some examples, aspects of the operations of 1610 may be performed by an error detector as described with reference to FIGS. 5 through 8.

At 1615, the UE may determine to transmit, via an uplink beam, a plurality of repetitions of the NACK message and error cause information based at least in part on the frequency selective fading error type and the configuration. The operations of 1615 may be performed according to the methods described herein. In some examples, aspects of the operations of 1615 may be performed by a feedback transmission selector as described with reference to FIGS. 5 through 8.

At 1620, the UE may determine that frequency selective fading is present during the downlink transmission is in response to an absence of an out of coverage error type for the downlink transmission, an absence of a complete beam blocking error type for the downlink transmission, an absence of a partial beam blocking error type for the downlink transmission, and an absence of an interference error type for the downlink transmission. The operations of 1620 may be performed according to the methods described herein. In some examples, aspects of the operations of 1620 may be performed by a frequency fading detector as described with reference to FIGS. 5 through 8.

At 1625, the UE may select the feedback transmission scheme for transmitting a NACK message for the downlink transmission based at least in part on the detected error being of the error type and the configuration. The operations of 1625 may be performed according to the methods described herein. In some examples, aspects of the operations of 1625 may be performed by a feedback transmission selector as described with reference to FIGS. 5 through 8.

At 1630, the UE may transmit the NACK message for the downlink transmission using the selected feedback transmission scheme. The operations of 1630 may be performed according to the methods described herein. In some examples, aspects of the operations of 1630 may be performed by a NACK manager as described with reference to FIGS. 5 through 8.

At 1635, the UE may determine that frequency selective fading is present during the downlink transmission, wherein the error type includes a frequency selective fading error type. The operations of 1635 may be performed according to the methods described herein. In some examples, aspects of the operations of 1635 may be performed by a frequency fading detector as described with reference to FIGS. 5 through 8.

Figure 17:
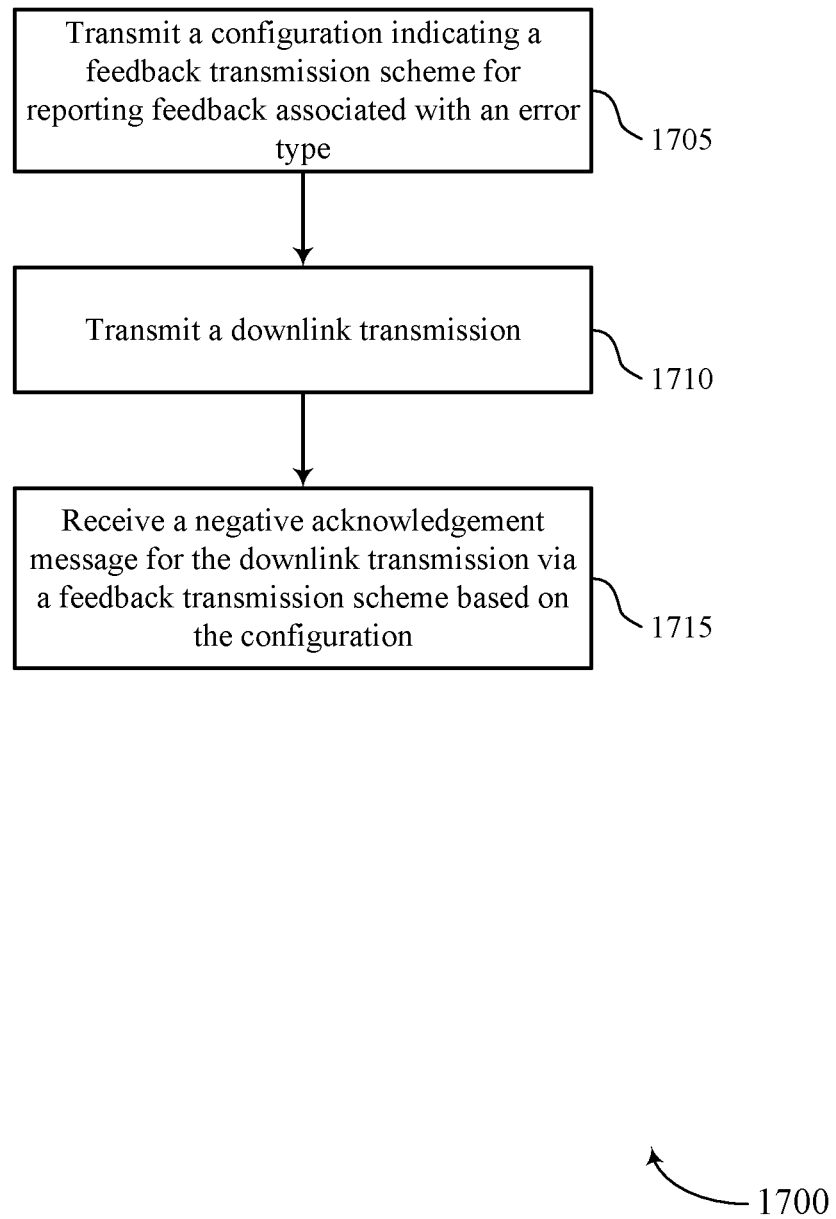

FIG. 17 shows a flowchart illustrating a method 1700 that supports using a configured NACK transmission scheme for error cause indication in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit a configuration indicating a feedback transmission scheme for reporting feedback associated with an error type. The operations of 1705 may be performed according to the methods described herein. In some examples, aspects of the operations of 1705 may be performed by a feedback configuration manager as described with reference to FIGS. 9 through 12.

At 1710, the base station may transmit a downlink transmission. The operations of 1710 may be performed according to the methods described herein. In some examples, aspects of the operations of 1710 may be performed by a downlink transmission manager as described with reference to FIGS. 9 through 12.

At 1715, the base station may receive a NACK message for the downlink transmission via a feedback transmission scheme based at least in part on the configuration. The operations of 1715 may be performed according to the methods described herein. In some examples, aspects of the operations of 1715 may be performed by a NACK manager as described with reference to FIGS. 9 through 12.

Figure 18:
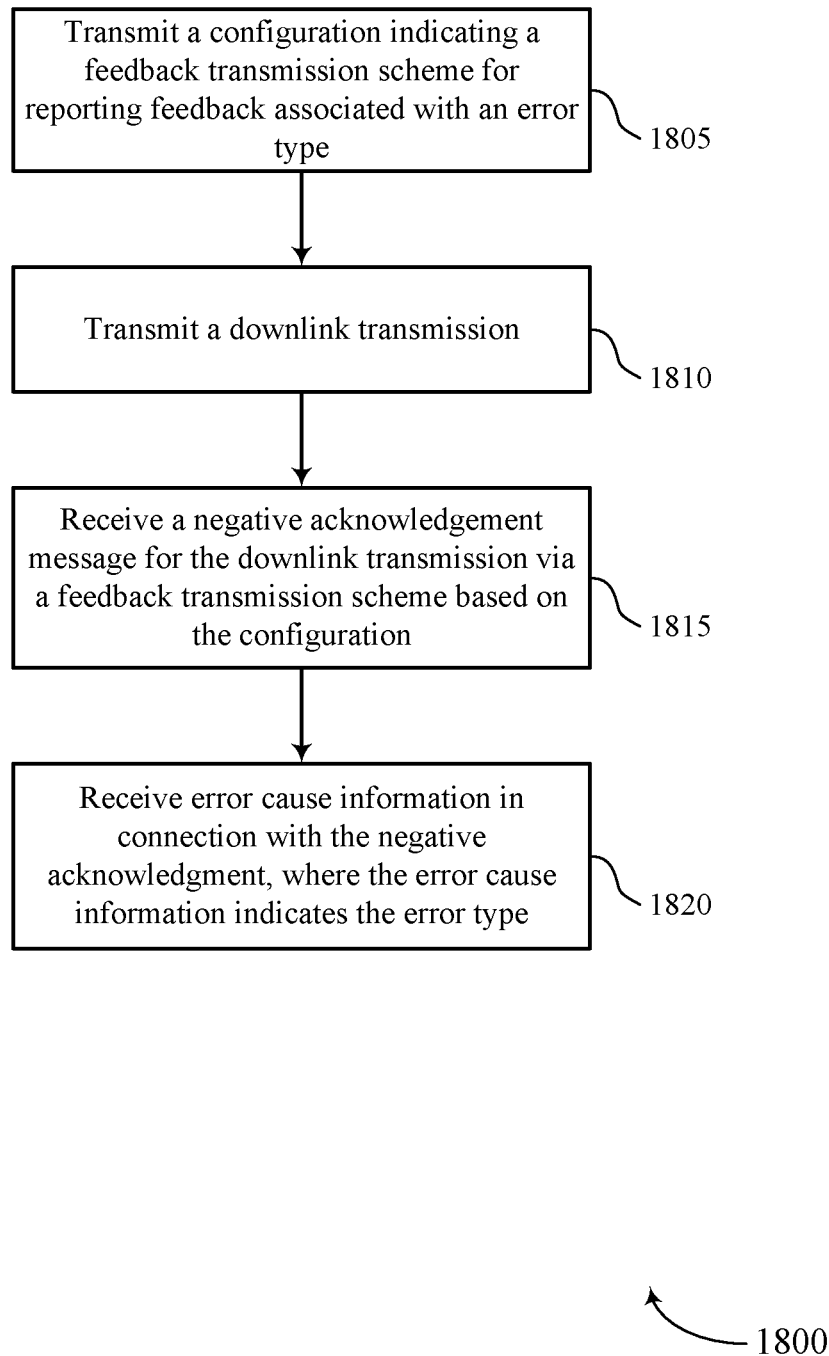

FIG. 18 shows a flowchart illustrating a method 1800 that supports using a configured NACK transmission scheme for error cause indication in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit a configuration indicating a feedback transmission scheme for reporting feedback associated with an error type. The operations of 1805 may be performed according to the methods described herein. In some examples, aspects of the operations of 1805 may be performed by a feedback configuration manager as described with reference to FIGS. 9 through 12.

At 1810, the base station may transmit a downlink transmission. The operations of 1810 may be performed according to the methods described herein. In some examples, aspects of the operations of 1810 may be performed by a downlink transmission manager as described with reference to FIGS. 9 through 12.

At 1815, the base station may receive a NACK message for the downlink transmission via a feedback transmission scheme based at least in part on the configuration. The operations of 1815 may be performed according to the methods described herein. In some examples, aspects of the operations of 1815 may be performed by a NACK manager as described with reference to FIGS. 9 through 12.

At 1820, the base station may receive error cause information in connection with the NACK, wherein the error cause information indicates the error type. The operations of 1820 may be performed according to the methods described herein. In some examples, aspects of the operations of 1820 may be performed by an error cause information manager as described with reference to FIGS. 9 through 12.

Figure 19:
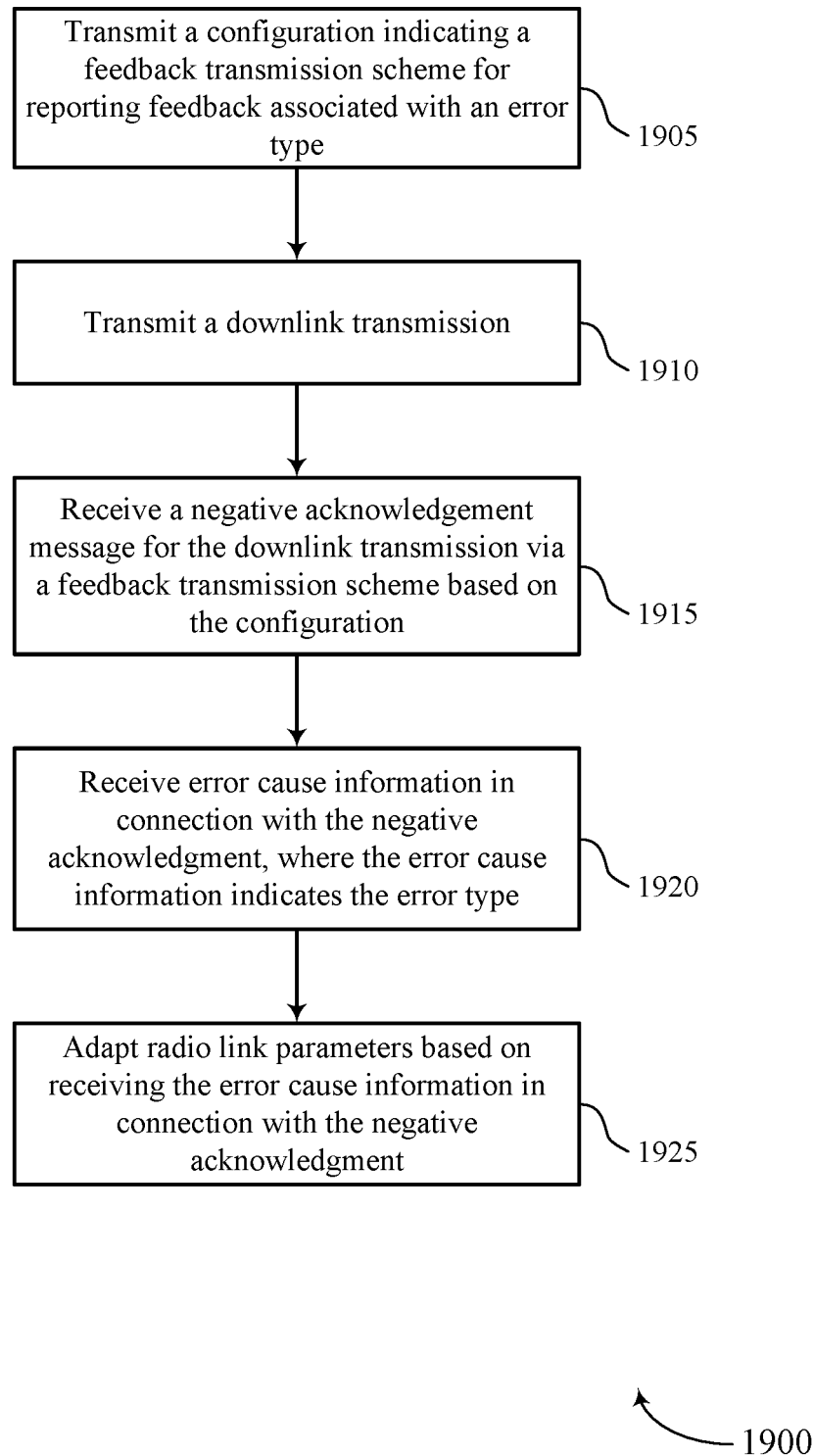

FIG. 19 shows a flowchart illustrating a method 1900 that supports using a configured NACK transmission scheme for error cause indication in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit a configuration indicating a feedback transmission scheme for reporting feedback associated with an error type. The operations of 1905 may be performed according to the methods described herein. In some examples, aspects of the operations of 1905 may be performed by a feedback configuration manager as described with reference to FIGS. 9 through 12.

At 1910, the base station may transmit a downlink transmission. The operations of 1910 may be performed according to the methods described herein. In some examples, aspects of the operations of 1910 may be performed by a downlink transmission manager as described with reference to FIGS. 9 through 12.

At 1915, the base station may receive a NACK message for the downlink transmission via a feedback transmission scheme based at least in part on the configuration. The operations of 1915 may be performed according to the methods described herein. In some examples, aspects of the operations of 1915 may be performed by a NACK manager as described with reference to FIGS. 9 through 12.

At 1920, the base station may receive error cause information in connection with the NACK, wherein the error cause information indicates the error type. The operations of 1920 may be performed according to the methods described herein. In some examples, aspects of the operations of 1920 may be performed by an error cause information manager as described with reference to FIGS. 9 through 12.

At 1925, the base station may adapt radio link parameters based at least in part on receiving the error cause information in connection with the NACK. The operations of 1925 may be performed according to the methods described herein. In some examples, aspects of the operations of 1925 may be performed by a radio link controller as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a configuration indicating a feedback transmission scheme for reporting feedback associated with an error type; detecting an error in receiving a downlink transmission, wherein the detected error is of the error type; selecting the feedback transmission scheme for transmitting a NACK message for the downlink transmission based at least in part on the detected error being of the error type and the configuration; and transmitting the NACK message for the downlink transmission using the selected feedback transmission scheme.

Aspect 2: The method of aspect 1, wherein transmitting the NACK message further comprises: transmitting error cause information in connection with the NACK message, wherein the error cause information indicates the error type.

Aspect 3: The method of any of aspects 1 through 2, wherein detecting the error in receiving the downlink transmission further comprises: determining that the UE is out of coverage of a base station during the downlink transmission, wherein the error type comprises an out of coverage error type.

Aspect 4: The method of aspect 3, wherein selecting the feedback transmission scheme for transmitting the NACK message for the downlink transmission further comprises: determining to perform beam sweeping for transmitting the NACK message and error cause information to the base station based at least in part on the out of coverage error type and the configuration.

Aspect 5: The method of any of aspects 1 through 4, wherein detecting the error in receiving the downlink transmission further comprises: determining that a transmit beam is completely blocked during the downlink transmission, wherein the error type comprises a complete beam blocking error type.

Aspect 6: The method of aspect 5, wherein selecting the feedback transmission scheme for transmitting the NACK message for the downlink transmission further comprises: determining to perform beam sweeping for transmitting the NACK message and error cause information based at least in part on the complete beam blocking error type and the configuration.

Aspect 7: The method of any of aspects 5 through 6, wherein determining that the transmit beam is completely blocked during the downlink transmission is in response to an absence of an out of coverage error type for the downlink transmission.

Aspect 8: The method of any of aspects 1 through 7, wherein detecting the error in receiving the downlink transmission further comprises: determining that a transmit beam is partially blocked during the downlink transmission, wherein the error type comprises a partial beam blocking error type.

Aspect 9: The method of aspect 8, wherein selecting the feedback transmission scheme for transmitting the NACK message for the downlink transmission further comprises: determining to perform beam sweeping for transmitting the NACK message and error cause information based at least in part on the partial beam blocking error type and the configuration.

Aspect 10: The method of any of aspects 8 through 9, wherein determining that the transmit beam is partially blocked during the downlink transmission is in response to an absence of an out of coverage error type for the downlink transmission and an absence of a complete beam blocking error type for the downlink transmission.

Aspect 11: The method of any of aspects 1 through 10, wherein detecting the error in receiving the downlink transmission further comprises: determining that interference is present during the downlink transmission, wherein the error type comprises an interference error type.

Aspect 12: The method of aspect 11, wherein selecting the feedback transmission scheme for transmitting the NACK message for the downlink transmission further comprises: determining to transmit, via an uplink beam without beam sweeping, the NACK message and error cause information based at least in part on the interference error type and the configuration.

Aspect 13: The method of any of aspects 11 through 12, wherein determining that interference is present during the downlink transmission is in response to an absence of an out of coverage error type for the downlink transmission, an absence of a complete beam blocking error type for the downlink transmission, and an absence of a partial beam blocking error type for the downlink transmission.

Aspect 14: The method of any of aspects 1 through 13, wherein detecting the error in receiving the downlink transmission further comprises: determining that frequency selective fading is present during the downlink transmission, wherein the error type comprises a frequency selective fading error type.

Aspect 15: The method of aspect 14, wherein selecting the feedback transmission scheme for transmitting the NACK message for the downlink transmission further comprises: determining to transmit, via an uplink beam, a plurality of repetitions of the NACK message and error cause information based at least in part on the frequency selective fading error type and the configuration.

Aspect 16: The method of aspect 15, further comprising: determining the plurality of repetitions to transmit based at least in part on the configuration, wherein the plurality of repetitions is in a frequency domain.

Aspect 17: The method of any of aspects 14 through 16, wherein determining that frequency selective fading is present during the downlink transmission is in response to an absence of an out of coverage error type for the downlink transmission, an absence of a complete beam blocking error type for the downlink transmission, an absence of a partial beam blocking error type for the downlink transmission, and an absence of an interference error type for the downlink transmission.

Aspect 18: The method of any of aspects 1 through 17, wherein detecting the error in receiving the downlink transmission further comprises: determining a cause of error for the downlink transmission is unknown is in response to an absence of an out of coverage error type for the downlink transmission, an absence of a complete beam blocking error type for the downlink transmission, an absence of a partial beam blocking error type for the downlink transmission, an absence of an interference error type for the downlink transmission, and an absence of a frequency selective fading, wherein the error type comprises an unknown error type.

Aspect 19: The method of aspect 18, wherein selecting the feedback transmission scheme for transmitting the NACK message for the downlink transmission further comprises: determining to perform beam sweeping for transmitting the NACK message and error cause information based at least in part on the unknown error type and the configuration.

Aspect 20: The method of any of aspects 1 through 19, further comprising: determining to perform a subset of an error cause protocol based at least in part on network deployment density, UE battery level, UE uplink load, or cross link interference detection.

Aspect 21: The method of aspect 20, wherein the subset of the error cause protocol comprises one or both of an interference check and a frequency fading check based at least in part on the UE battery level being below a battery threshold.

Aspect 22: The method of any of aspects 20 through 21, wherein the subset of the error cause protocol comprises one or both of an interference check and a frequency fading check based at least in part on the UE uplink load being above an uplink load threshold.

Aspect 23: The method of any of aspects 20 through 22, wherein the subset of the error cause protocol comprises one or both of an interference check and a frequency fading check based at least in part on the cross link interference detection at an additional UE.

Aspect 24: The method of any of aspects 1 through 23, wherein receiving the configuration for reporting feedback associated with error detection further comprises: receiving a radio resource control message comprising an information element for reporting feedback associated with error detection.

Aspect 25: A method for wireless communications at a base station, comprising: transmitting a configuration indicating a feedback transmission scheme for reporting feedback associated with an error type; transmitting a downlink transmission; and receiving a NACK message for the downlink transmission via the feedback transmission scheme based at least in part on the configuration.

Aspect 26: The method of aspect 25, wherein receiving the NACK message further comprises: receiving error cause information in connection with the NACK message, wherein the error cause information indicates the error type.

Aspect 27: The method of aspect 26, further comprising: adapting radio link parameters based at least in part on receiving the error cause information in connection with the NACK message.

Aspect 28: The method of any of aspects 25 through 27, wherein the configuration indicates to perform a beam sweep as the feedback transmission scheme based at least in part on an out of coverage error type.

Aspect 29: The method of any of aspects 25 through 28, wherein the configuration indicates to perform a beam sweep as the feedback transmission scheme based at least in part on a complete beam blocking error type.

Aspect 30: The method of any of aspects 25 through 29, wherein the configuration indicates to perform a beam sweep as the feedback transmission scheme based at least in part on a partial beam blocking error type.

Aspect 31: The method of any of aspects 25 through 30, wherein the configuration indicates to transmit via an uplink beam without beam sweeping as the feedback transmission scheme based at least in part on an interference error type.

Aspect 32: The method of any of aspects 25 through 31, wherein the configuration indicates to transmit via an uplink beam without beam sweeping as the feedback transmission scheme based at least in part on a frequency selective fading error type.

Aspect 33: The method of aspect 32, wherein the configuration indicates a plurality of repetitions in a frequency domain to transmit based at least in part on the frequency selective fading error type.

Aspect 34: The method of any of aspects 25 through 33, wherein the configuration indicates to perform a beam sweep as the feedback transmission scheme based at least in part on an unknown error type.

Aspect 35: The method of any of aspects 25 through 34, wherein transmitting the configuration for reporting feedback associated with error detection further comprises: transmitting a radio resource control message comprising an information element for reporting feedback associated with error detection.

Aspect 36: An apparatus for wireless communications at a UE, comprising a processor; memory coupled with the processor; and instructions stored in the memory and executable by the processor to cause the apparatus to perform a method of any of aspects 1 through 24.

Aspect 37: An apparatus for wireless communications at a UE, comprising at least one means for performing a method of any of aspects 1 through 24.

Aspect 38: A non-transitory computer-readable medium storing code for wireless communications at a UE, the code comprising instructions executable by a processor to perform a method of any of aspects 1 through 24.

Aspect 39: An apparatus for wireless communications at a base station, comprising a processor; memory coupled with the processor; and instructions stored in the memory and executable by the processor to cause the apparatus to perform a method of any of aspects 25 through 35.

Aspect 40: An apparatus for wireless communications at a base station, comprising at least one means for performing a method of any of aspects 25 through 35.

Aspect 41: A non-transitory computer-readable medium storing code for wireless communications at a base station, the code comprising instructions executable by a processor to perform a method of any of aspects 25 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors; and
   a memory coupled with the one or more processors, wherein the memory comprises instructions executable by the one or more processors to cause the apparatus to:
      receive a configuration indicating a feedback transmission scheme for reporting feedback associated with an error type;
      detect an error in receiving a downlink transmission, wherein the detected error is of the error type;
      select the feedback transmission scheme for transmitting a negative acknowledgement message for the downlink transmission based at least in part on the detected error in receiving the downlink transmission being of the error type and the configuration; and
      transmit the negative acknowledgement message for the downlink transmission using the selected feedback transmission scheme.

2. The apparatus of claim 1, wherein the instructions to transmit the negative acknowledgement message further are executable by the processor to cause the apparatus to:
   transmit error cause information in connection with the negative acknowledgement message, wherein the error cause information indicates the error type.

3. The apparatus of claim 1, wherein the instructions to detect the error in receiving the downlink transmission further are executable by the one or more processors to cause the apparatus to:
   determine that the UE is out of coverage of a base station during the downlink transmission, wherein the error type comprises an out of coverage error type.

4. The apparatus of claim 3, wherein the instructions to select the feedback transmission scheme for transmitting the negative acknowledgement message for the downlink transmission further are executable by the one or more processors to cause the apparatus to:
   determine to perform beam sweeping for transmitting the negative acknowledgement message and error cause information to the base station based at least in part on the out of coverage error type and the configuration.

5. The apparatus of claim 1, wherein the instructions to detect the error in receiving the downlink transmission further are executable by the one or more processors to cause the apparatus to:
   determine that a transmit beam is completely blocked during the downlink transmission, wherein the error type comprises a complete beam blocking error type.

6. The apparatus of claim 5, wherein the instructions to select the feedback transmission scheme for transmitting the negative acknowledgement message for the downlink transmission further are executable by the one or more processors to cause the apparatus to:
   determine to perform beam sweeping for transmitting the negative acknowledgement message and error cause information based at least in part on the complete beam blocking error type and the configuration.

7. The apparatus of claim 5, wherein determining that the transmit beam is completely blocked during the downlink transmission is in response to an absence of an out of coverage error type for the downlink transmission.

8. The apparatus of claim 1, wherein the instructions to detect the error in receiving the downlink transmission further are executable by the one or more processors to cause the apparatus to:
   determine that a transmit beam is partially blocked during the downlink transmission, wherein the error type comprises a partial beam blocking error type.

9. The apparatus of claim 8, wherein the instructions to select the feedback transmission scheme for transmitting the negative acknowledgement message for the downlink transmission further are executable by the one or more processors to cause the apparatus to:
determine to perform beam sweeping for transmitting the negative acknowledgement message and error cause information based at least in part on the partial beam blocking error type and the configuration.

10. The apparatus of claim 8, wherein determining that the transmit beam is partially blocked during the downlink transmission is in response to an absence of an out of coverage error type for the downlink transmission and an absence of a complete beam blocking error type for the downlink transmission.

11. The apparatus of claim 1, wherein the instructions to detect the error in receiving the downlink transmission further are executable by the one or more processors to cause the apparatus to:
determine that interference is present during the downlink transmission, wherein the error type comprises an interference error type.

12. The apparatus of claim 11, wherein the instructions to select the feedback transmission scheme for transmitting the negative acknowledgement message for the downlink transmission further are executable by the one or more processors to cause the apparatus to:
determine to transmit, via an uplink beam without beam sweeping, the negative acknowledgement message and error cause information based at least in part on the interference error type and the configuration.

13. The apparatus of claim 11, wherein determining that interference is present during the downlink transmission is in response to an absence of an out of coverage error type for the downlink transmission, an absence of a complete beam blocking error type for the downlink transmission, and an absence of a partial beam blocking error type for the downlink transmission.

14. The apparatus of claim 1, wherein the instructions to detect the error in receiving the downlink transmission further are executable by the one or more processors to cause the apparatus to:
determine that frequency selective fading is present during the downlink transmission, wherein the error type comprises a frequency selective fading error type.

15. The apparatus of claim 14, wherein the instructions to select the feedback transmission scheme for transmitting the negative acknowledgement message for the downlink transmission further are executable by the one or more processors to cause the apparatus to:
determine to transmit, via an uplink beam, a plurality of repetitions of the negative acknowledgement message and error cause information based at least in part on the frequency selective fading error type and the configuration.

16. The apparatus of claim 15, wherein the instructions are further executable by the one or more processors to cause the apparatus to:
determine the plurality of repetitions to transmit based at least in part on the configuration, wherein the plurality of repetitions is in a frequency domain.

17. The apparatus of claim 14, wherein determining that frequency selective fading is present during the downlink transmission is in response to an absence of an out of coverage error type for the downlink transmission, an absence of a complete beam blocking error type for the downlink transmission, an absence of a partial beam blocking error type for the downlink transmission, and an absence of an interference error type for the downlink transmission.

18. The apparatus of claim 1, wherein the instructions to detect the error in receiving the downlink transmission further are executable by the one or more processors to cause the apparatus to:
determine a cause of error for the downlink transmission is unknown is in response to an absence of an out of coverage error type for the downlink transmission, an absence of a complete beam blocking error type for the downlink transmission, an absence of a partial beam blocking error type for the downlink transmission, an absence of an interference error type for the downlink transmission, and an absence of a frequency selective fading, wherein the error type comprises an unknown error type.

19. The apparatus of claim 18, wherein the instructions to select the feedback transmission scheme for transmitting the negative acknowledgement message for the downlink transmission further are executable by the one or more processors to cause the apparatus to:
determine to perform beam sweeping for transmitting the negative acknowledgement message and error cause information based at least in part on the unknown error type and the configuration.

20. The apparatus of claim 1, wherein the instructions are further executable by the one or more processors to cause the apparatus to:
determine to perform a subset of an error cause detection protocol based at least in part on network deployment density, UE battery level, UE uplink load, or cross link interference detection.

21. The apparatus of claim 20, wherein the subset of the error cause detection protocol comprises one or both of an interference check and a frequency fading check based at least in part on the UE battery level being below a battery threshold.

22. The apparatus of claim 20, wherein the subset of the error cause detection protocol comprises one or both of an interference check and a frequency fading check based at least in part on the UE uplink load being above an uplink load threshold.

23. The apparatus of claim 20, wherein the subset of the error cause detection protocol comprises one or both of an interference check and a frequency fading check based at least in part on the cross link interference detection at an additional UE.

24. The apparatus of claim 1, wherein the instructions to receive the configuration for reporting feedback associated with error detection further are executable by the one or more processors to cause the apparatus to:
receive a radio resource control message comprising an information element for reporting feedback associated with error detection.

25. An apparatus for wireless communications at a base station, comprising:
one or more processors; and
a memory coupled with the one or more processors, wherein the memory comprises instructions executable by the one or more processors to cause the apparatus to:
transmit a configuration indicating a feedback transmission scheme for reporting feedback associated with an error type;
transmit a downlink transmission; and
receive a negative acknowledgement message for the downlink transmission via the feedback transmission scheme based at least in part on the configuration, the feedback transmission scheme being based at least in part on an error of the error type in the downlink transmission.

26. The apparatus of claim 25, wherein the instructions to receive the negative acknowledgement message further are executable by the processor to cause the apparatus to:
receive error cause information in connection with the negative acknowledgement message, wherein the error cause information indicates the error type.

27. The apparatus of claim 26, wherein the instructions are further executable by the one or more processors to cause the apparatus to:
adapt radio link parameters based at least in part on receiving the error cause information in connection with the negative acknowledgement message.

28. The apparatus of claim 25, wherein the configuration indicates to perform a beam sweep as the feedback transmission scheme based at least in part on an out of coverage error type.

29. A method for wireless communications at a user equipment (UE), comprising:
receiving a configuration indicating a feedback transmission scheme for reporting feedback associated with an error type;
detecting an error in receiving a downlink transmission, wherein the detected error is of the error type;
selecting the feedback transmission scheme for transmitting a negative acknowledgement message for the downlink transmission based at least in part on the detected error in receiving the downlink transmission being of the error type and the configuration; and
transmitting the negative acknowledgement message for the downlink transmission using the selected feedback transmission scheme.

30. A method for wireless communications at a base station, comprising:
transmitting a configuration indicating a feedback transmission scheme for reporting feedback associated with an error type;
transmitting a downlink transmission; and
receiving a negative acknowledgement message for the downlink transmission via the feedback transmission scheme based at least in part on the configuration, the feedback transmission scheme being based at least in part on an error of the error type in the downlink transmission.

* * * * *